United States Patent [19]

Smith et al.

[11] Patent Number: 5,210,387
[45] Date of Patent: May 11, 1993

[54] FOOD HANDLING SYSTEM

[75] Inventors: Donald P. Smith, Dallas; Michael J. Dobie, Double Oak; Alden B. Sparman, Sr.; John R. Norris, both of Plano; Donald P. Lohr, Dallas; Gerald Easterling, Carrollton; R. W. Taylor, Southlake, all of Tex.

[73] Assignee: Patentsmith Corporation, Dallas, Tex.

[21] Appl. No.: 723,250

[22] Filed: Jun. 28, 1991

Related U.S. Application Data

[63] Continuation-in-part of Ser. No. 463,279, Jan. 10, 1990, Pat. No. 5,147,994.

[51] Int. Cl.$^5$ ............................................. H05B 6/64
[52] U.S. Cl. .................. 219/10.55 M; 219/10.55 A; 219/10.55 D; 219/10.55 E; 219/10.55 F; 219/10.55 R; 99/DIG. 14; 99/427; 221/150 A; 221/150 R
[58] Field of Search ............... 219/10.55 M, 10.55 R, 219/10.55 A, 10.55 E, 10.55 F, 10.55 D, 400, 401; 221/150 A, 150 R, 150 HC; 99/DIG. 14, 355, 357, 427; 426/241, 466

[56] References Cited

U.S. PATENT DOCUMENTS

| | | | |
|---|---|---|---|
| 3,283,113 | 7/1963 | Smith | 219/10.55 R |
| 3,333,666 | 8/1967 | Murray et al. | 219/10.55 R |
| 3,343,479 | 9/1967 | Wassberg | 219/10.55 R |
| 3,381,605 | 5/1968 | Smith | 219/10.55 R |
| 3,386,550 | 6/1968 | Murray et al. | 219/10.55 R |
| 3,397,817 | 8/1968 | Smith | 219/10.55 R |
| 3,442,200 | 5/1969 | Babel | 99/357 |
| 3,534,676 | 10/1970 | Rubino | 99/355 |
| 3,884,213 | 5/1975 | Smith | 126/21 A |
| 4,004,712 | 1/1977 | Pond | 221/150 A |
| 4,144,438 | 3/1979 | Gelman et al. | 219/10.55 E |
| 4,154,861 | 5/1979 | Smith | 426/466 |
| 4,190,757 | 2/1980 | Turpin et al. | 219/10.55 E |
| 4,289,792 | 9/1981 | Smith | 426/241 |
| 4,374,318 | 2/1983 | Gilliom | 219/400 |
| 4,398,651 | 8/1983 | Kumpfer | 219/10.55 R |
| 4,409,453 | 10/1983 | Smith | 219/10.55 A |
| 4,592,485 | 6/1986 | Anderson et al. | 221/150 HC |
| 4,626,641 | 12/1986 | Brown | 219/10.55 E |
| 4,745,249 | 5/1988 | Daniels | 219/10.55 E |
| 4,762,250 | 8/1988 | Friberg | 221/123 |
| 4,783,582 | 11/1988 | Wada et al. | 219/10.55 R |
| 4,784,292 | 11/1988 | Johndrow et al. | 221/101 |
| 4,835,351 | 5/1989 | Smith et al. | 219/10.55 R |
| 4,925,684 | 5/1990 | Simon | 426/107 |
| 4,940,869 | 7/1990 | Scholtes et al. | 219/10.55 F |
| 5,011,042 | 4/1991 | Bunce et al. | 219/10.55 R |

Primary Examiner—Bruce A. Reynolds
Assistant Examiner—Tu Hoang
Attorney, Agent, or Firm—Crutsinger & Booth

[57] ABSTRACT

A method and apparatus for vending a hot food product wherein a sealed container is moved from a protective sleeve and deposited in an oven where heat is transferred to the container for initially melting a protective sealing film and then heating the food product. After the food product has been heated, the container is removed from the oven and reinserted into the protective sleeve prior to dispensing the heated food product.

25 Claims, 20 Drawing Sheets

FOOD HANDLING SYSTEM

CROSS-REFERENCE TO RELATED APPLICATIONS

This application is a continuation-in-part of U.S. patent application Ser. No. 07/463,279 filed Jan. 10, 1990, as now U.S. Pat. No. 5,147,994 entitled "MICROWAVE VENDING MACHINE".

TECHNICAL FIELD

The disclosed invention relates to a hot meal vending device which employs a combination of microwave and convection heating.

BACKGROUND INVENTION

Vending machines for dispensing hot and cold drinks, candy, cookies, potato chips and other snack foods have enjoyed significant commercial success. However, vending machines for dispensing meals have been limited to dispensers of refrigerated foods such as sandwiches, salads and the like.

Devices heretofore devised for incorporating electronic ovens in food vending machines are disclosed in U.S. Pat. No. 3,333,666; U.S. Pat. No. 3,343,479; U.S. Pat. No. 3,386,550; U.S. Pat. No. 3,397,817; U.S. Pat. No. 3,534,676; U.S. Pat. No. 4,004,712; U.S. Pat. No. 4,398,651; U.S. Pat. No. 4,592,485; U.S. Pat. No. 4,762,250; U.S. Pat. No. 4,783,582 and U.S. Pat. No. 4,784,292.

Vending machines for hot meals generally include a refrigerated compartment for preserving food, a microwave oven compartment for fast cooking, and a conveyor for transferring food from the refrigerated compartment into the microwave oven. However, since vending machines for hot foods have enjoyed very limited commercial success, separate microwave ovens for heating food items removed from a refrigerator are commonly employed in convenience stores, airports, cafeterias and other food vending operations.

Microwave heating of certain foods, including pizza and sandwiches which contain dough and bakery products, typically leaves the surface too moist and less palatable than similar food products cooked in other types of ovens.

Ovens of the type disclosed in U.S. Pat. No. 4,289,792; U.S. Pat. No. 4,409,453 and U.S. Pat. No. 4,835,351 employ air jets which impinge upon the surface of a food product to provide surface heating of the product in combination with microwave heating. Jet impingement ovens have enjoyed significant success in commercial food service and commercial food processing operations. However, a long felt need exists for apparatus for quickly and efficiently heating food products which require little or no preparation for use in a vending machine for hot meals.

SUMMARY OF INVENTION

The vending machine for hot foods includes an oven cabinet having an interior divided by a perforated plate to prevent transfer of microwave energy from a cooking compartment to an air conditioning compartment in the cabinet. The conditioning chamber houses air circulating apparatus to recirculate temperature controlled air from the conditioning chamber through the cooking chamber to facilitate crisping and browning to provide a desired surface texture. Microwave heating apparatus communicates with the cooking chamber to provide rapid heating of the food by electro-magnetic excitation.

A method for controlling the temperature and surface texture of a product includes the steps of: positioning a product in a container having upwardly extending sides and a bottom; positioning the product and container in a temperature controlled atmosphere; supporting the product above the bottom of the container; and forming a region of controlled air pressure alternately adjacent opposite sides of the product by directing air to flow alternately adjacent opposite sides of the product such that temperature controlled air flows between the lower surface of the product and the bottom of the container.

DESCRIPTION OF DRAWINGS

Drawings of a preferred embodiment of the microwave vending machine are annexed hereto so that the invention may be better and more fully understood, in which.

Numeral references are employed to designate like parts throughout the various figures of the drawing.

DESCRIPTION OF PREFERRED EMBODIMENT

Figure 3:
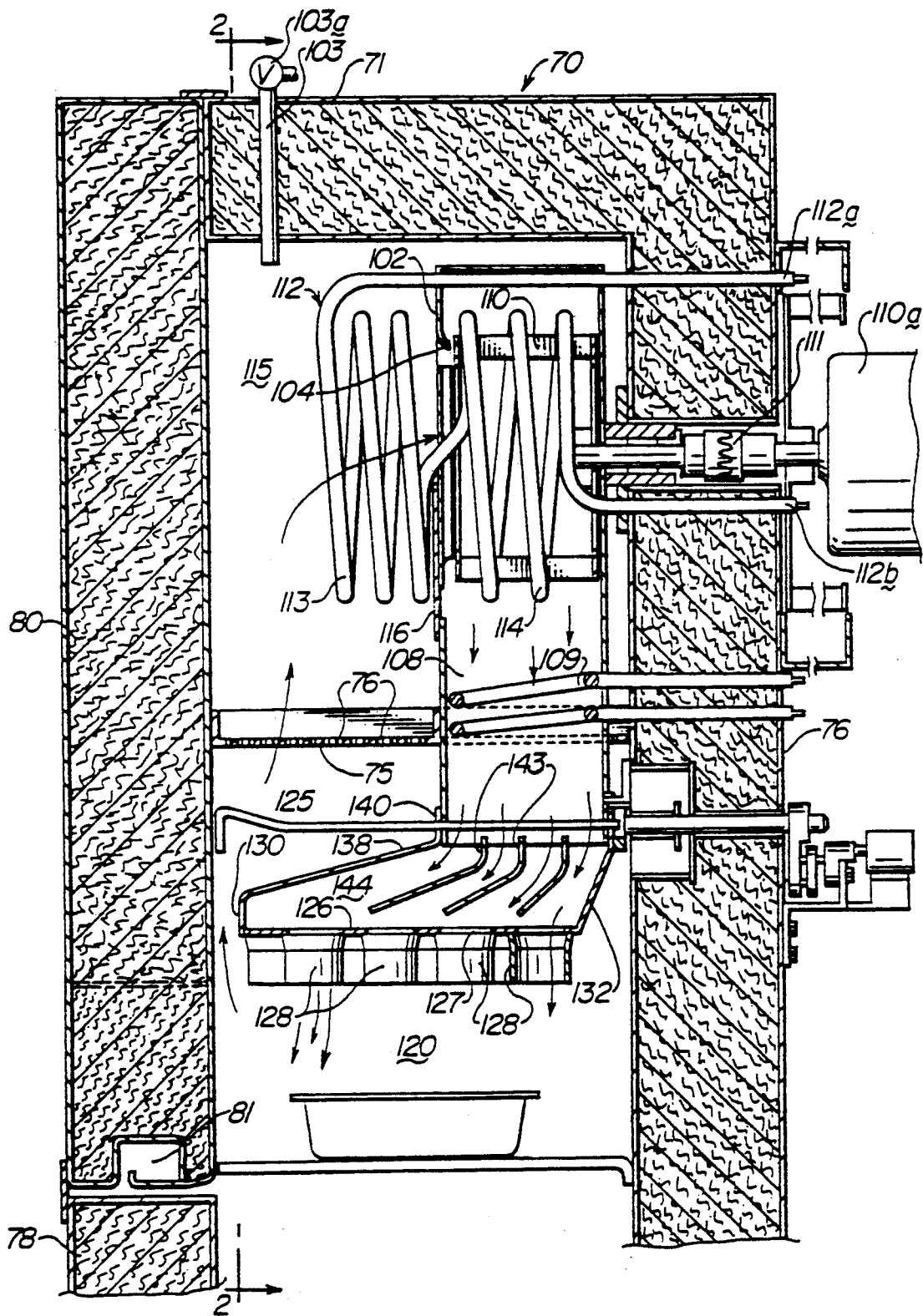
FIG. 3 is a cross-sectional view taken along line 3—3 of FIG. 2.

Referring to FIGS. 1, 4, 7 and 13 of the drawings, the numeral 10 generally designates a package which is moved by package handling apparatus 40 into and out of an oven 70 in a vending machine 200. As will be hereinafter more fully explained, a source 90 of electromagnetic radiation and air circulating apparatus 100 are employed for heating a food product 30 selected by a consumer upon depositing the purchase price of the food product in the vending machine 200 illustrated in FIG. 13. As best illustrated in FIG. 3 of the drawing, the vending machine 200 is preferably adapted to serve, for example, hot food products 0 to a customer within about one and a half to two minutes. In the illustrated embodiments, the food products 30 may, for example, include french fried potatoes, chicken nuggets, pizza, and submarine sandwiches.

The vending machine 200 is mounted in an enclosure cabinet having a back wall 201, spaced side walls 202 and 204, a front panel 205, a top wall 206 and a bottom wall 208. The front panel 205 is preferably hingedly secured to side wall 202 and provided with a key actuated lock 210 securing the front panel 205 in a closed and locked position to prevent unauthorized access to the interior of the enclosure. A currency receiving mechanism 212 adapted to accept both coins and bills is mounted on front panel 205 along with a coin return slot 214 for returning change to the customer.

Selector plates 216, 218, 220 and 222 are mounted on the front panel 205 for use by the customer to designate the food item selected to be heated and dispensed through a delivery passage 224 closed by a protective door 225. Product identification panels 215, 217, 219 and 221 are associated with selector plates 216, 218, 220 and 222, respectively, to inform the customer what food item can be selected by touching one of the selector plates. Identification panel 215 is provided with a graphic illustration of fried potatoes permitting use of the vending machine 200 by persons who do not speak or read a particular language. Additional indicia including words, numerals or other and graphic representations may be applied to each of the panels 215, 217, 219 and 221.

A condiment holding chamber 209 is provided for holding packets of salt, pepper, sugar, ketchup, mustard and barbecue sauce.

As will be hereinafter more fully explained, a refrigerated food storage cabinet 170 is preferably mounted in the lower portion of the interior of the enclosure 200 and package handling apparatus 40 and oven 70 are mounted above and adapted to receive selected packages of food products from the refrigerated storage compartment 170 transported by an elevator 180.

Each selector plate 216, 218, 220 and 222 is preferably connected to an electrical circuit adapted to initiate a sequence of events provided that payment for the food item 30 has been received in the currency receiving mechanism 212. As will be hereinafter more fully explained, touching selector plate 220 indicates that pizza, graphically illustrated on product identification panel 219 is to be dispensed. A container 10 containing pizza will be automatically moved from the refrigerated storage compartment 170 onto an elevator 180 and delivered to the package handling apparatus 40 which will move the package 10 to oven 70 for heating and then dispense the heated product 30 through the delivery passage 224 which is accessible to the customer by raising door 225.

The electrical circuit controlling the heating of the selected food product 30 preferably includes three programmed elements for delivering a predetermined type of heating for a pre-programmed time interval to the selected food product. The programmable circuit preferably includes, for example, devices to program the heating cycle by coordination with the location of the selected food item in the storage compartment 170, a bar code or other readable mechanism on the package, and symbols displayed on or adjacent selector plates 215–221 for the user to touch. From the foregoing, it should be readily apparent that touching one of the selector plates 216, 218, 220 or 222 based on the visual selection of a food item graphically illustrated on product identification panels 215, 217, 219 or 221 initiates a programmed sequence to control the heating cycle of the selected food product 30.

Figure 7:
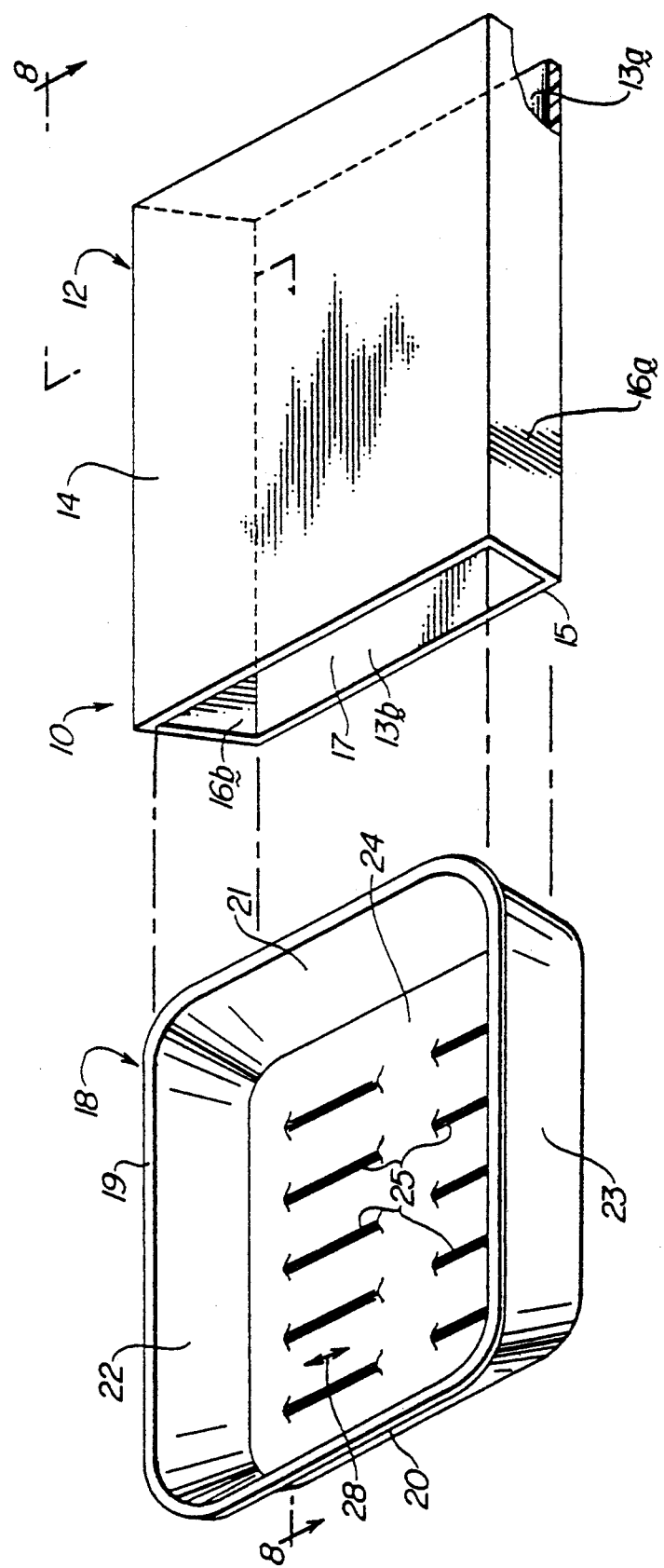
FIG. 7 is an exploded perspective view of a container and protective sleeve which form a package for a food product.
Figure 8:
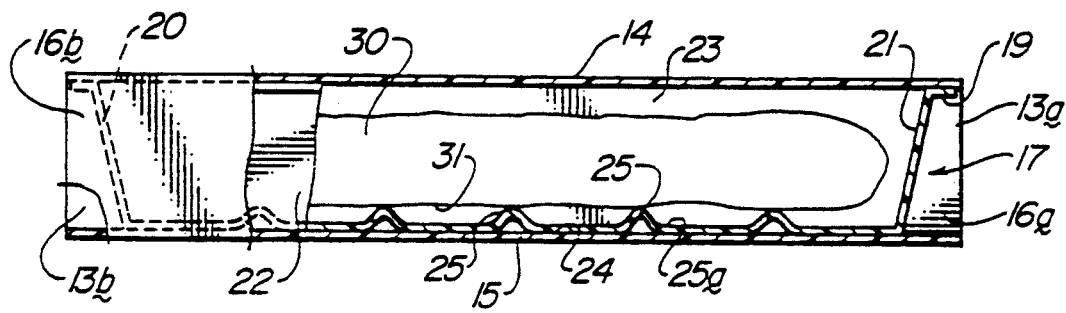
FIG. 8 is an elevational view of the package illustrated in FIG. 7, parts being broken away to more clearly illustrated details of construction.

Package 10, best illustrated in FIGS. 7 and 8, comprises a tubular sleeve 12 having open ends 13a and 13b. Sleeve 12 is formed by a top 14, bottom 15 and side walls 16a and 16b having peripheral edges connected to form an interior cavity 17 for a container 18. Bottom 15 is narrower than top 14 and side walls 16a and 16b are inclined relative to vertical planes.

Container 18 is an open topped tray formed by side walls 20 and 21 having end walls 22 and 23 secured between opposite ends thereof and a bottom wall 24. Support ribs 25 or other suitable projections extend upwardly from bottom wall 24 for supporting a food product 30 spaced from bottom wall 24 to provide space forming a path 28 extending between the lower surface 31 of the food product 30 and the upper surface 25a of the bottom wall 24 of container 18.

The package 10 carries the food product 30 in the open-top container 18 which is enclosed in the tube-like sleeve 12, preferably constructed of cellulosic or other poorly conductive material. The food product 30 is stored in a cabinet 170 in the container 18 inside of the sleeve covers 12. The container 18 is withdrawn from the sleeve 12 prior to heating the food product 30 and then the food 30 and container 18 are returned to the sleeve 12 to retain heat in the food until the package 10 is opened by the customer.

It should be readily apparent that refrigeration of food product 30 may not be necessary if food product 30 is not perishable or if package 10 containing the food product has been treated to assure that food product 30 has sufficient shelf life. Cabinet 170 may be refrigerated or divided into compartments, some of which are refrigerated depending upon the nature of the food product to be dispensed by the vending machine 200.

The relatively non-conducting sleeve 12 serves as a comfortable holder for the hot container 18 and food 30.

The cover for the container 18, having a lip 19 which extends around the periphery of upper edges of walls 20, 21, 22 and 23, is formed by the top 14 of sleeve 12 to provide a slip-over lid which covers the open top of the container 18 and can be removed for heating and subsequently provides insulated cool handling of the hot product 30 by enclosing the lip 19 of the container 18.

Figure 9:
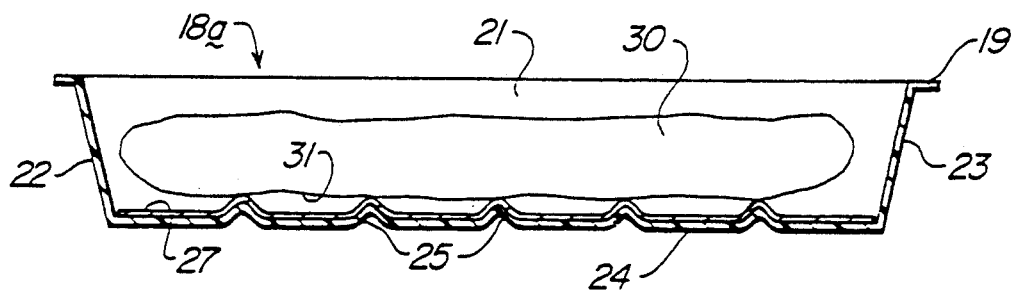
FIG. 9 is a fragmentary diagrammatic view illustrating a modified form of a food container having susceptor film mounted therein.

In FIG. 9 of the drawing, the numeral 18a generally designates a modified form of the container having a susceptor belt 27 mounted adjacent bottom 24 of the container having ribs 25 formed thereon. The susceptor belt coating 27 is formed of polyethylene terephthalate and is commercially available from a variety of sources including Frigigold of England and is recommended for use in reusable plastic or paperboard microwave cook ware in a recommended temperature range of up to 450° F. The susceptor belt 27 is rapidly heated by microwave energy until it reaches a maximum temperature of, for example, 350° F. and the temperature level is maintained to provide radiant and conductive bottom heat to the food product 30.

Figure 10:
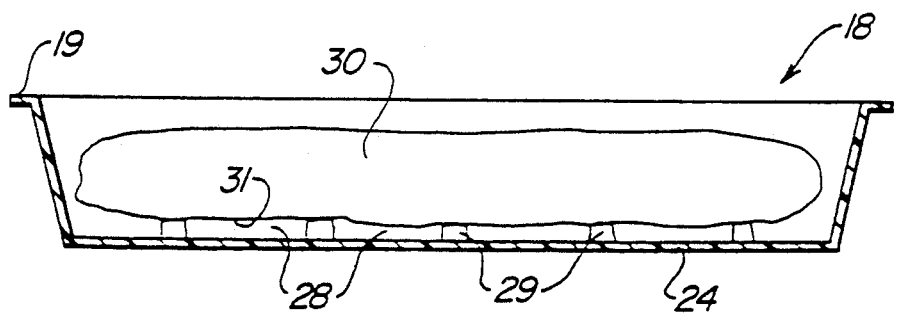
FIG. 10 is a fragmentary diagrammatic view of a food container having a bottom layer of french fried food material and an upper layer of a different food product.

In the embodiment of the container 18 illustrated in FIG. 10 of the drawing, a layer 29 of a particulate food product, such as strips of pasta or slices of potato, is positioned between the bottom wall 24 of container 18 and the lower surface 31 of food product 30. If layer 29 is slices of potato and product 30 is a meat product, juices dripping from the lower surface of food product 30 will contact and be absorbed by layer 29 of potato slices to enhance the cooking of both the slices of potato and the meat product 30. The liquid juices enhance the flavor and appearance of the potatoes while the circulation of air through passages 28 between the potato slices results in controlled drying and evaporation of moisture from the bottom of the food product 30 to provide an acceptable texture, taste, smell and appearance superior to that conventionally achieved in microwave ovens. As illustrated in FIGS. 15-21 of the drawing, the food product 30a may comprise particulate material, such as slices of fried potatoes and a corrugated susceptor belt 27 is mounted adjacent bottom 24 to form ribs 25. Since the susceptor belt 27 is controllably heated by the microwave and portions of the upwardly extending ribs 25 contact the lower surface of the food product, the structure simulates grilling as well as allowing juices to flow into the area between the ribs.

Figure 15:
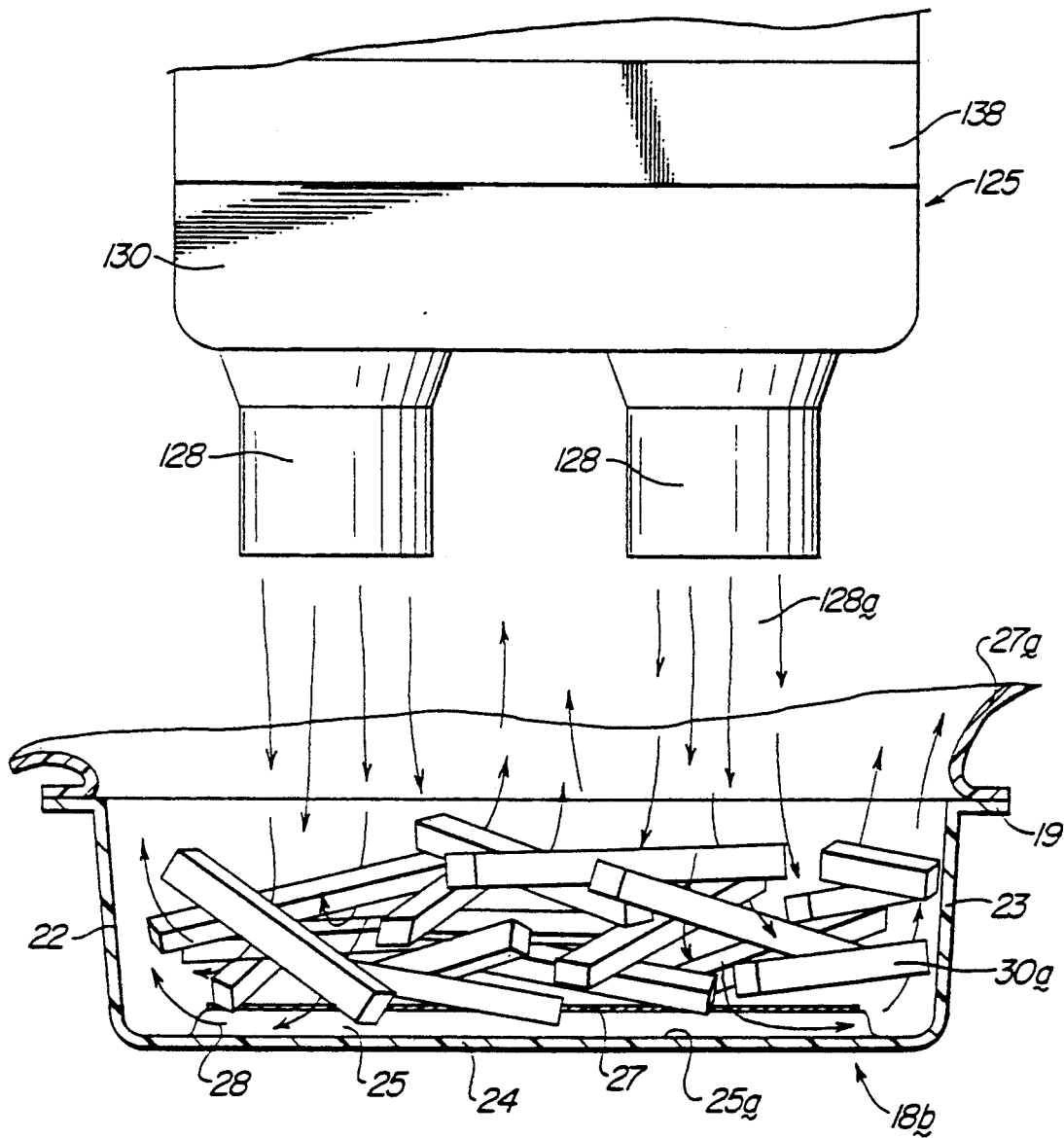
FIG. 15 is a diagrammatic view similar to FIG. 11 illustrating air flow through a particulate food product.
Figure 16:
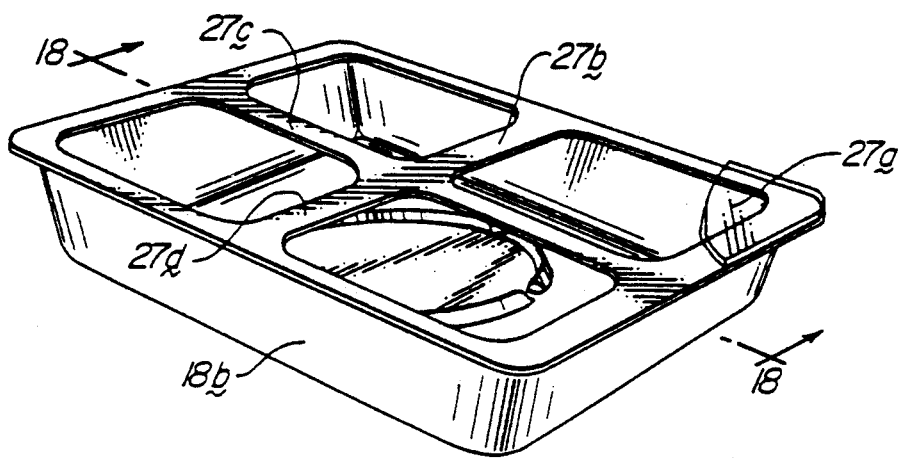
FIG. 16 is a perspective view of a container having a lattice bridging the open top thereof.
Figure 17:
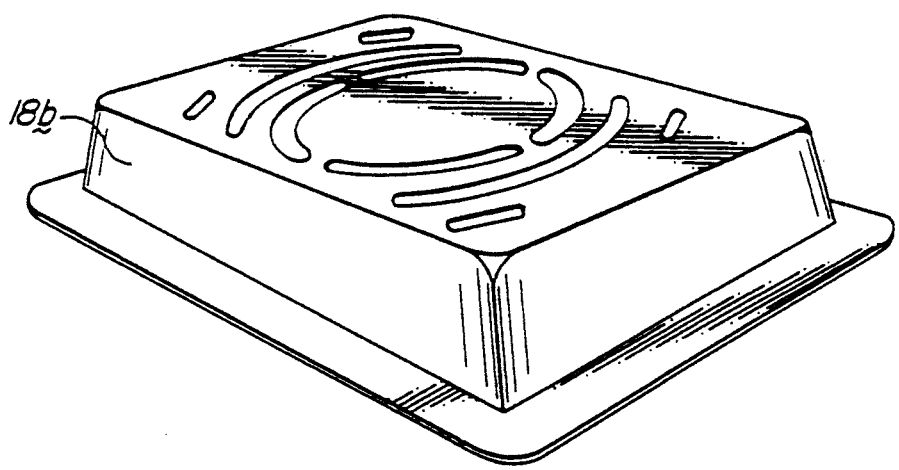
FIG. 17 is a perspective view of the bottom of the container illustrated in FIG. 16.
Figure 18:
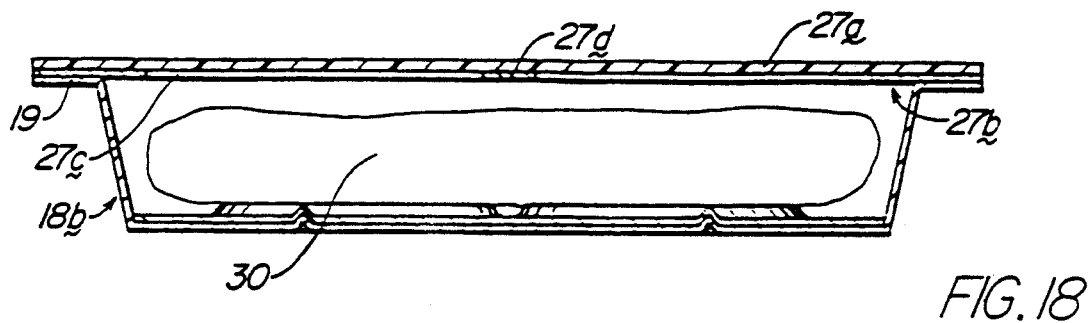
FIG. 18 is a cross-sectional view taken along line 18—18 of FIG. 16.

Container 18b, illustrated in FIG. 15, is proided with a sheet 27a of a heat shrinkable film bonded to lip 19 for sealing the food product 30a in the container 18b. A sheet 27a preferably formed of polymeric compounds and materials, for example, synthetic thermoplastic resins of the type which are commercially available from E.I. DuPont de Nemours and Co. of Wilmington, Del., used to form a polyester film which will melt when contacted by air at a temperature of less than 400° F. which results in film 27a becoming perforated and rolling toward lip 19 which extends around the periphery of container 18b. The cohesive nature of the polyester material prevents it from dripping into the food container. It should be readily apparent that the use of the polyester film 27a provides a seal which prevents deterioration of food product 30a over an extended period of time in a refrigerator or freezer.

A perforated grid or lattic 27b, illustrated in FIG. 16 and FIGS. 18-21, may be mounted between the upper surface of lip 19 and the lower surface of sheet 27a. Legs 27c and 27d spanning across the top of container 18b support film 27a to assure that portions of film 27a do not drop downwardly to engage the food product 30a in container 18b.

As diagrammatically illustrated in FIGS. 18-21 of the drawing, film 27a and lattice 27b are bonded or otherwise sealingly secured to the lip 19 which extends around the periphery of the open top of container 18b to prevent dehydration and to otherwise protect food product 30a in container 18b. Food product 30 is supported on susceptor belt 27 having upwardly extending projections 25 formed thereon for spacing the lower surface of food product 30 above the bottom of container 18b to form air passages therebetween as hereinbefore described.

Figure 19:
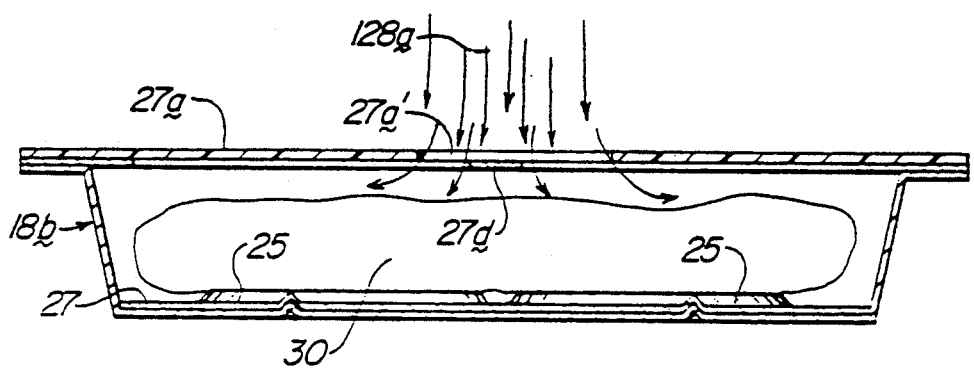
FIGS. 19-21 are cross-sectional views similar to FIG. 18 diagrammatically illustrating the progressive heating of a film sealing the container to uncover a food product in the container.

As illustrated in FIG. 19 of the drawing, impingement of air stream 128a against the upper surface of film 27a causes a central portion of film 27a to be perforated forming an opening 27a' in a central portion of the film intermediate edges of container 18b.

Figure 20:
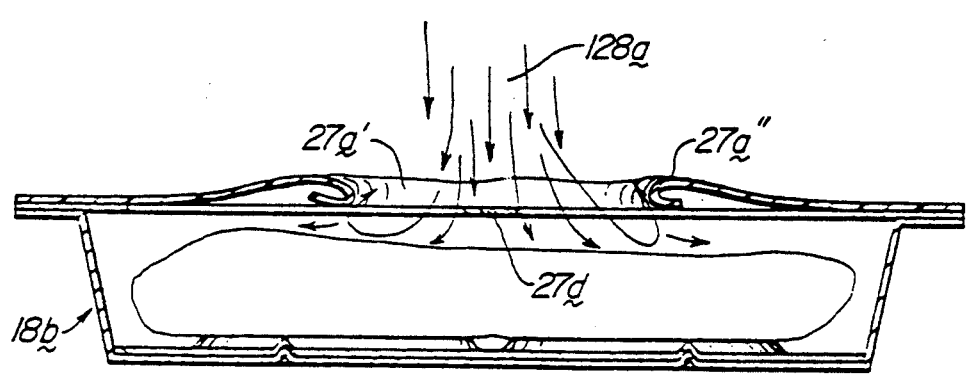

As illustrated in FIG. 20, opening 27a' is enlarged as heat is transferred to the film 27a which tends to roll back as indicated at 27a" as the film material shrinks and is distorted.

Figure 21:
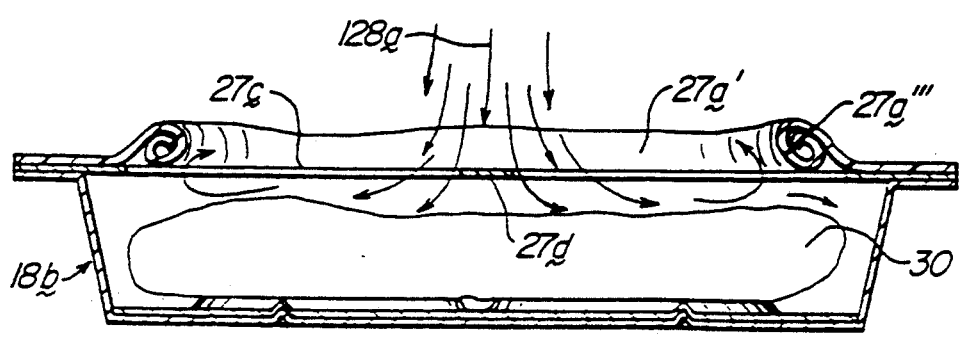

As illustrated in FIG. 21 of the drawing, heat transferred to the film 27a causes the meltable and shrinkable film 27a to retract to the position designated 27a''' thereby uncovering the upper surface of food product in container 18b.

It should be appreciated that container 18b is preferably stored in a tubular sleeve 12 of the type hereinbefore described to prevent perforation of sealing film 27a during handling of containers while being transported for stocking storage cabinet 170. As will be hereinafter more fully explained, after container 18b has been moved into heat exchange relation with streams 128a of heated air projected by air circulating apparatus 100, container 18b is reinserted into the tubular sleeve 12 prior to dispensing the food product to the customer so that the hot container 18b and the food product 30 therein can be handled by the customer to eliminate the necessity for providing "hot pads" or other apparatus for handling the hot container.

Figure 1:
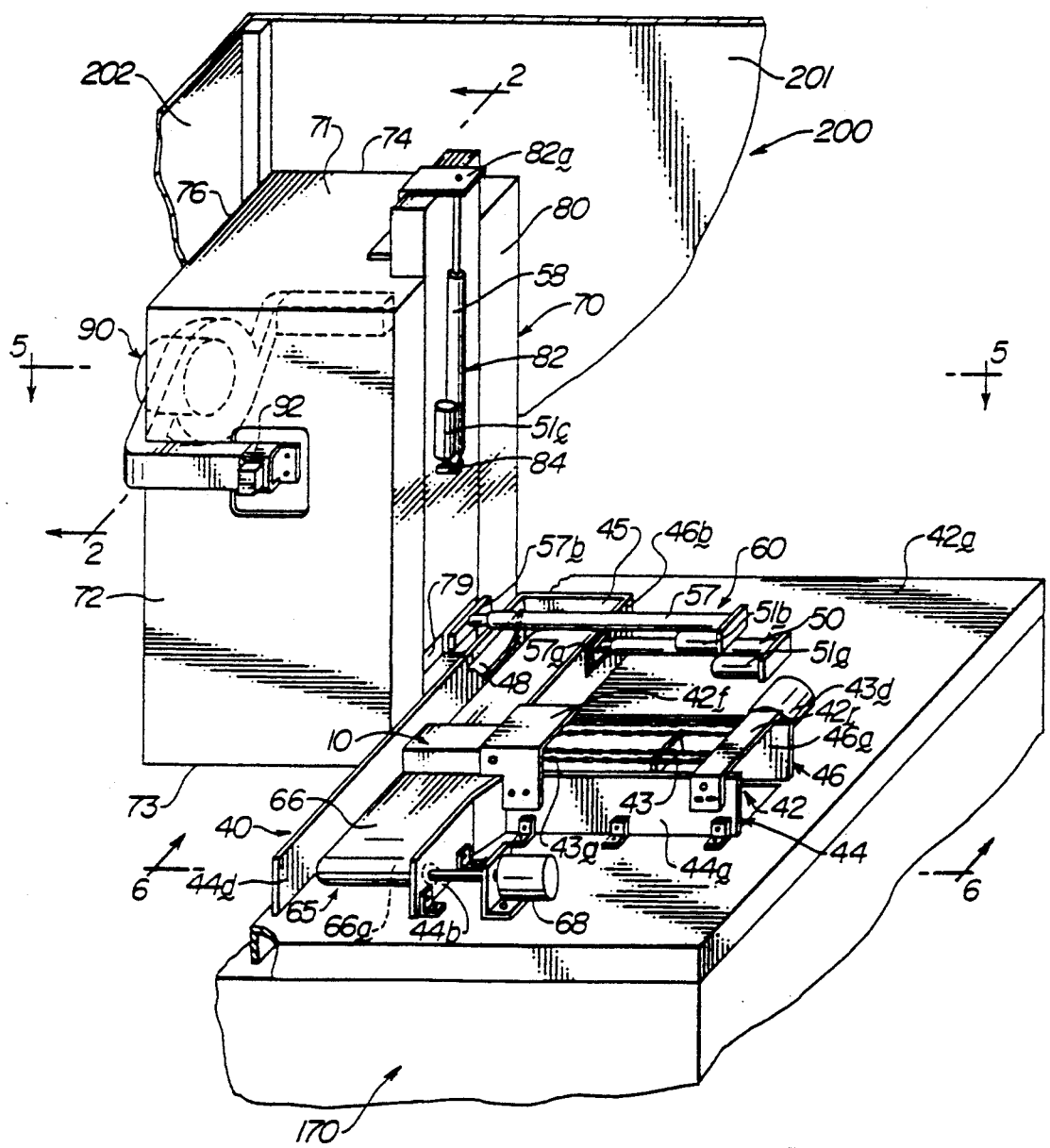
FIG. 1 is a perspective view of a package handling apparatus and oven cabinet inside a vending machine, the outer cabinet of the vending machine being broken away to more clearly illustrate details of construction.
Figure 14:
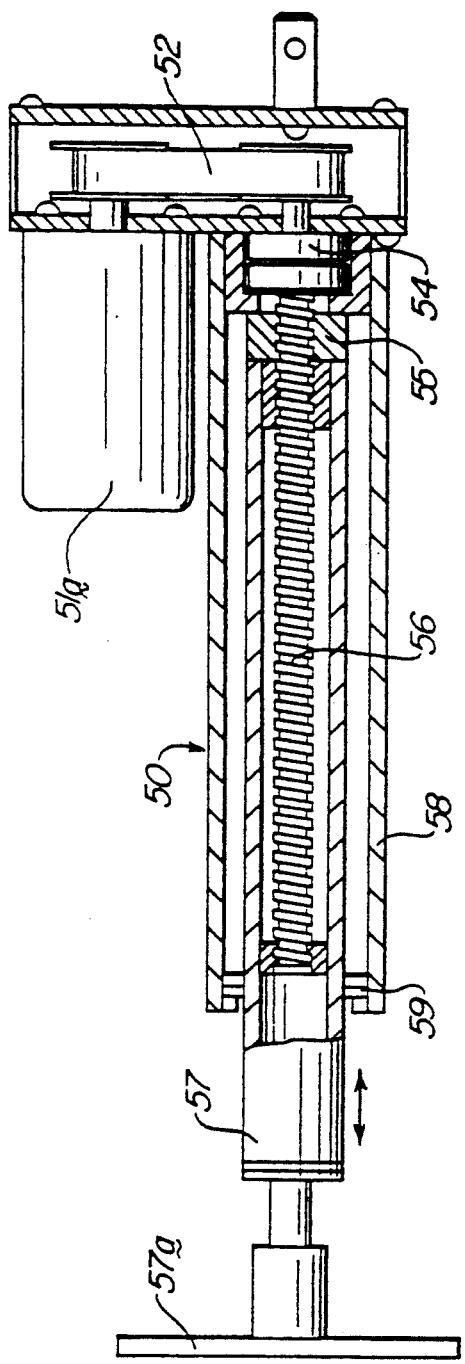
FIG. 14 is a cross sectional view taken through the electromechanical linear actuator.

As best illustrated in FIGS. 1 and 14, package handling apparatus 40 includes a container loading device 50 and a container unloading device 60. The loading device 50 and unloading device 60 are of substantially identical construction and comprise motors 51a and 51b, respectively, drivingly connected through synchronous drive belts 52 to the end of drive screws 56. Each drive screw 56 has threads formed on the outer surface thereof which engage internal threads in a drive nut 55 which moves linearly along drive screw 56 as the drive screw rotates. Thrust is transmitted from the drive nut 55 to a transitional tube 57. The entire screw 56 and nut 55 assembly is protected from contamination and environmental elements by a cover tube 58, and an end wiper seal 59. Rotational thrust bearings 54 allow the screw 56 to freely rotate under loaded conditions.

The electromechanical linear actuators 50 and 60 are commercially available from Jasta, Inc. of San Jose, Calif. and from Dayton Electric Manufacturing Co. of Chicago, Ill., and form no part of the invention except in the claimed combination.

Motors 51a and 51b are preferably variable speed reversible synchronous gear motors. It should be readily apparent that motors 51a and 51b transmit torque through belt 52 for rotating drive screws 56. Rotation of drive screw 56 causes drive nut 55 which is secured to the inner end of translating tube 57 to move translating tube 57 to extend or retract tube 57 relative to cover tube 58.

Figure 5:
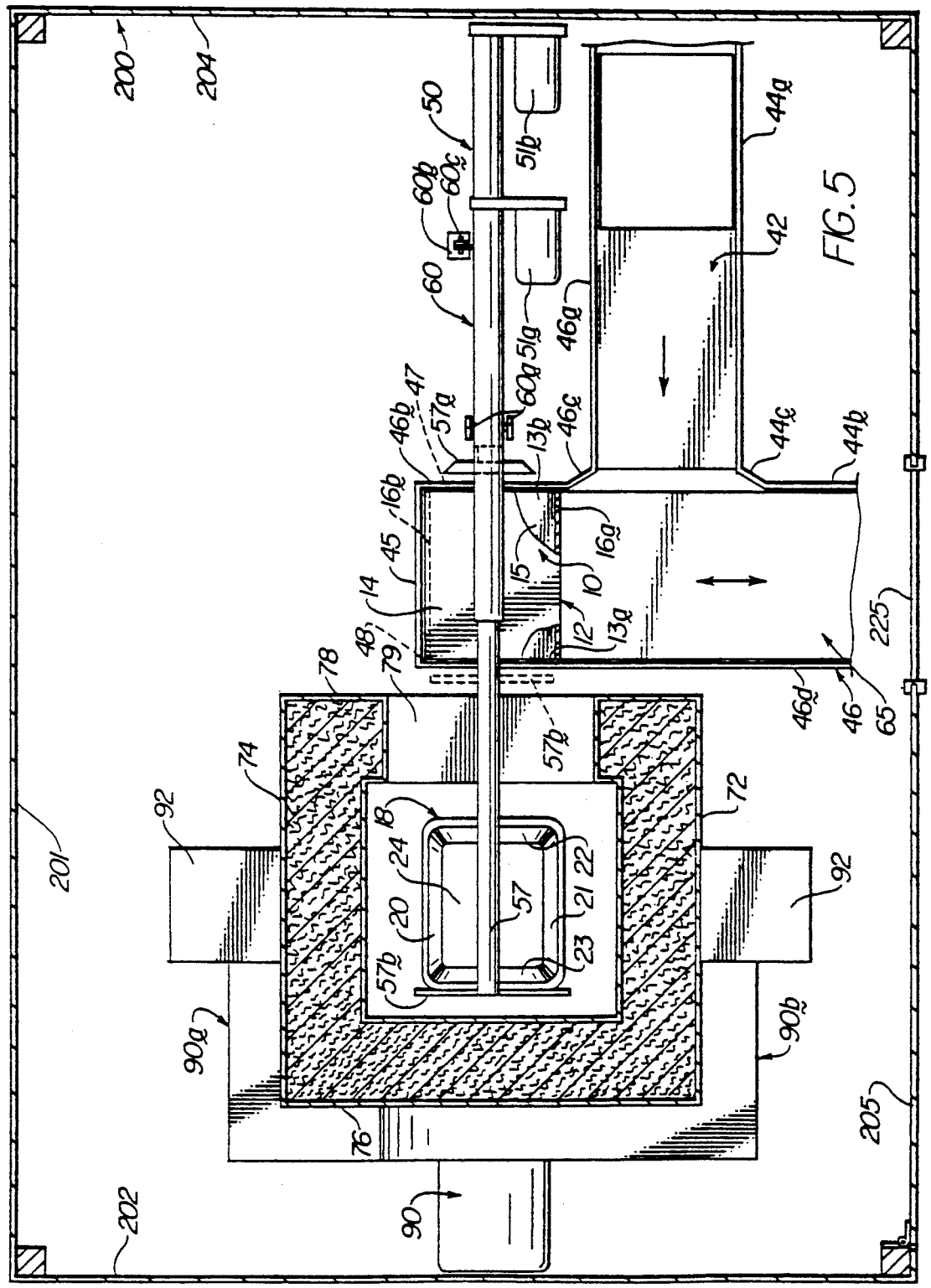
FIG. 5 is a cross-sectional view taken along line 5—5 of FIG. 1.
Figure 6:
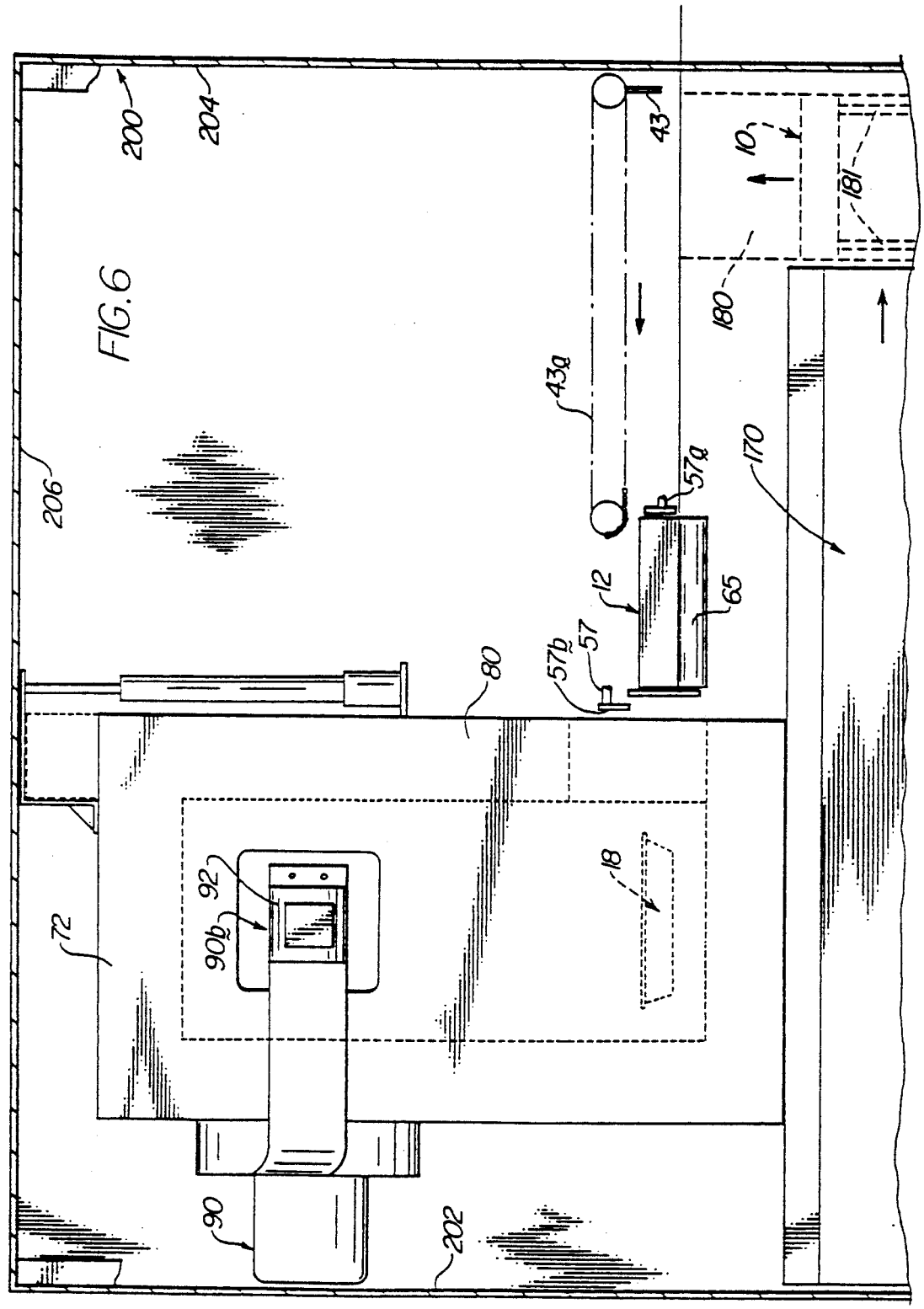
FIG. 6 is a cross-sectional view taken along line 6—6 of FIG. 1.

As diagrammatically illustrated in FIG. 5 of the drawing, electromechanical actuator 60 having rake plate 57b mounted thereon is pivotally mounted between a pair of lugs 60a and is rocked in a vertical plane by a solenoid 60b connected to an actuating arm 60c secured to cover tube 58 of actuator 60.

When rake plate 57b is in its retracted home position indicated in dashed outline at 57b in FIG. 5 of the drawing, rake plate 57b is preferably positioned at an elevation above container 18 such that when translating tube 57 is extended to the full outline position, the lower edge of rake plate 57b moves above the upper edge of container 18. When rake plate 57b reaches the full outline position illustrated in FIG. 5 of the drawing, solenoid 60b is actuated for moving rake plate 57b downwardly to an elevation below the lip extending around container 18 such that when translating tube 57 is retracted to the dashed outline position, container 18 will be returned through passage 48 in product guide member 46 and returned to the interior of tubular sleeve 12. After container 18 has been deposited in tubular sleeve 12, solenoid 60b will again be actuated for elevating rake plate 57b to a position above the upper edge of opening 48 such that pusher plate 57a may be actuated for moving the next container 18 into the oven.

Conveyor 65 includes a flexible belt 66 extending around a drive roller 66a and a driven roller 66b, drive roller 66a being driven by a reversible variable speed motor 68.

The in-feed conveyor, generally designated by the numeral 42, comprises a paddle 43 suspended between chains 43a and 43b which extend around drive sprockets mounted on a shaft driven by a motor 43d. The in-feed conveyor 42 is mounted between guide members 44 and 46. As illustrated in FIG. 5, guide member 44 comprises a generally L-shaped member formed by substantially perpendicularly disposed legs 44a and 44b connected by a transition section 44c. Product guide member 44 is connected to a second product guide member 46 by a front bracket 42f and a rear bracket 42r. As illustrated in FIG. 1 of the drawing, an in-feed drive motor 43d is secured to guide member 46 and paddle 43 is moved between guide members 44 and 46 by chains 43a and 43b.

Product guide member 46, best illustrated in FIG. 5, is formed by generally perpendicularly disposed legs 46a and 46b connected by a transition section 46c. A third leg 46d extends generally parallel to leg 46b and has an end secured to an end of leg 46b by stop member 45. As will be hereinafter more fully explained, stop member 45 functions as a stop to limit movement of package 10.

Leg 46b of product guide member 46 has a first passage 47 formed therein while section 44d has a second passage 48 formed therein. As will be hereinafter more fully explained, when conveyor 65 moves package 10 into engagement with backstop 45, the open end 13a of tubular sleeve 20 is positioned adjacent opening 47 while the open end 13b of sleeve 20 is positioned adjacent passage 48. When motor 51a of the linear actuator of loader assembly 50 is energized, tube 57 and push plate 57a on the end thereof will move through passage 47 and through the open end 13b of sleeve 12 for moving container 18 through the open end 13a of sleeve 12 and through passage 48 into a cooking chamber in oven 70. After container 18 is positioned in the cooking chamber, motor 51a is reversed, thereby retracting translating tube 57 and push plate 57a to the position illustrated in FIG. 1 of the drawing.

After the product 30 in container 18 has been heated, motor 51b of the linear actuator of the unloading assembly 60 will be energized to extend the translating tube 57 of the unloading assembly 60 causing the rake plate 57b to move into the cooking compartment above container 18 and then pivot downwardly for engaging lip 19 on end wall 23 on container 18. Motor 51b is then reversed for retracting tube 57 and rake plate 57b for urging container 18 out of the oven 70, through passage 48 and through the open end 13a of sleeve 12. When motor 68 is energized, the heated food product 30 in container 18 which has been repositioned in sleeve 12 will be moved toward the delivery end of conveyor 65.

Product guide members 44 and 46 are bolted or otherwise secured to the upper surface of loader base member 42a upon which in-feed conveyor 42 and delivery conveyor 65 are mounted.

The oven 70 comprises spaced side walls 72 and 74, a back wall 76 and a front wall 78. Front wall 78 has an access opening 79 formed therein which is opened or closed by a door 80. A microwave trap 81 is formed around door 80 and is configured to prevent passage of microwave energy through space between the periphery of the door 80 and walls of the cabinet 70. Top wall 71 and bottom wall 73 close upper and lower ends of oven 70. Each wall of the oven is preferably formed by spaced metallic sheets and the space between the sheets is filled with thermal insulation material.

An actuator 82, secured to mounting bracket 82a, is connected through a link 84 to door 80 for moving door 80 vertically relative to access opening 79. Actuator 82 is preferably an electromechanical actuator of the type illustrated in FIG. 14 and is driven by a motor 51a.

Figure 2:
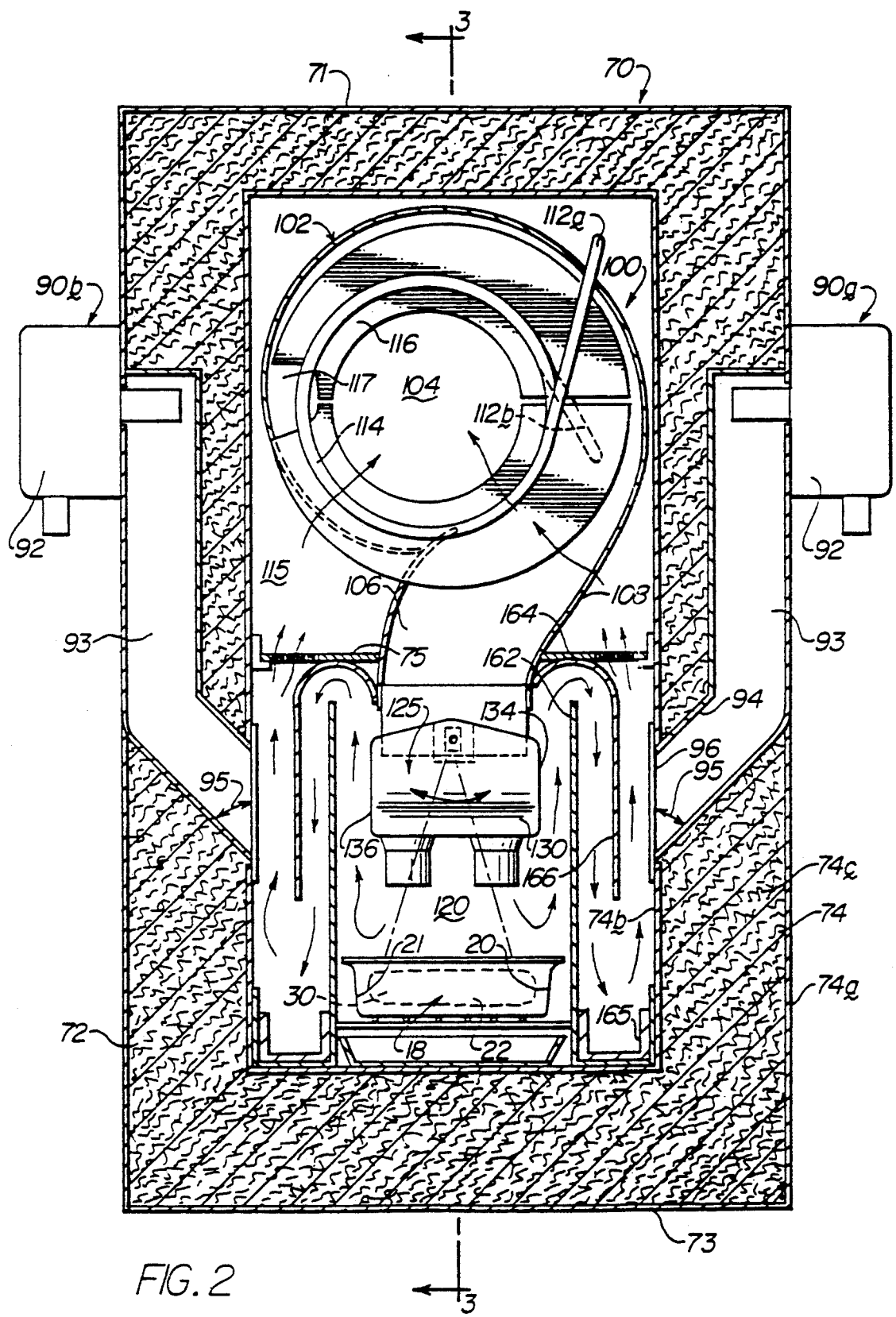
FIG. 2 is a cross-sectional view taken along line 2—2 of FIG. 1.

Referring to FIGS. 1 and 2 of the drawing, electromagnetic radiation device generally designated by the numeral 90 in the illustrated embodiment comprise a pair of magnetrons 92 connected to wave guides 93 formed in side walls 72 and 74 of oven 70. The magnetrons 92 supply electromagnetic energy to wave guides which carry the energy to the cooking chamber. A preferred microwave frequency is 2450 megahertz. Magnetrons 92 are conventional vacuum tubes in the microwave oven that convert electrical energy to electro magnetic energy in the microwave frequency spectrum. Waves of microwave energy are similar to radio waves except they are higher frequency than radio waves lower frequency than ordinary light waves. The microwave energy is channeled through wave guides 93 from the magnetrons 92 into the cooking chamber 120.

As illustrated in FIG. 2 of the drawing, the side walls 72 and 74 are formed by spaced sheets 74a and 74b and insulation material 74c is configured to form a guide tube 93 having a lower end 94 which is inclined at an angle 95 relative to a vertical plane 96 at an angle in a range between 15° and 75°. In the illustrated embodiment, the angle 95 is approximately 45°.

The application of microwave radiant heating is delivered from two sides and angles downwardly toward food 30 in an open top container 18. Since the container and the food in the container do not reflect microwave significantly and since the space under the container diffuses microwave which passes through or by the container the beam from one wave guide is not reflected directly into the other but is largely retained in the heating chamber.

Since the container 18 is non-metallic reflections from one wave guide 93 are not reflected into the other to keep microwave in the chamber 120 to effectively heat the food 30.

The support for the open package is preferably less than 25% reflective of the microwave.

The reflective surface of the bottom 24 of the container 18 is greater than one-fourth wave length, for 2450 megahertz (MHZ) microwave one-fourth of 13 cm, below the surface of food being heating. The angle and the distance reduce standing waves in the small heating cavity.

A tube 103 is connected through a valve 103a to a supply of water or steam and which may be used for delivering an atomized spray of water or steam into the air conditioning chamber 115 for controlling the relative humidity and dew point of air circulated through air conditioning chamber 115 and cooking chamber 120.

Figure 4:
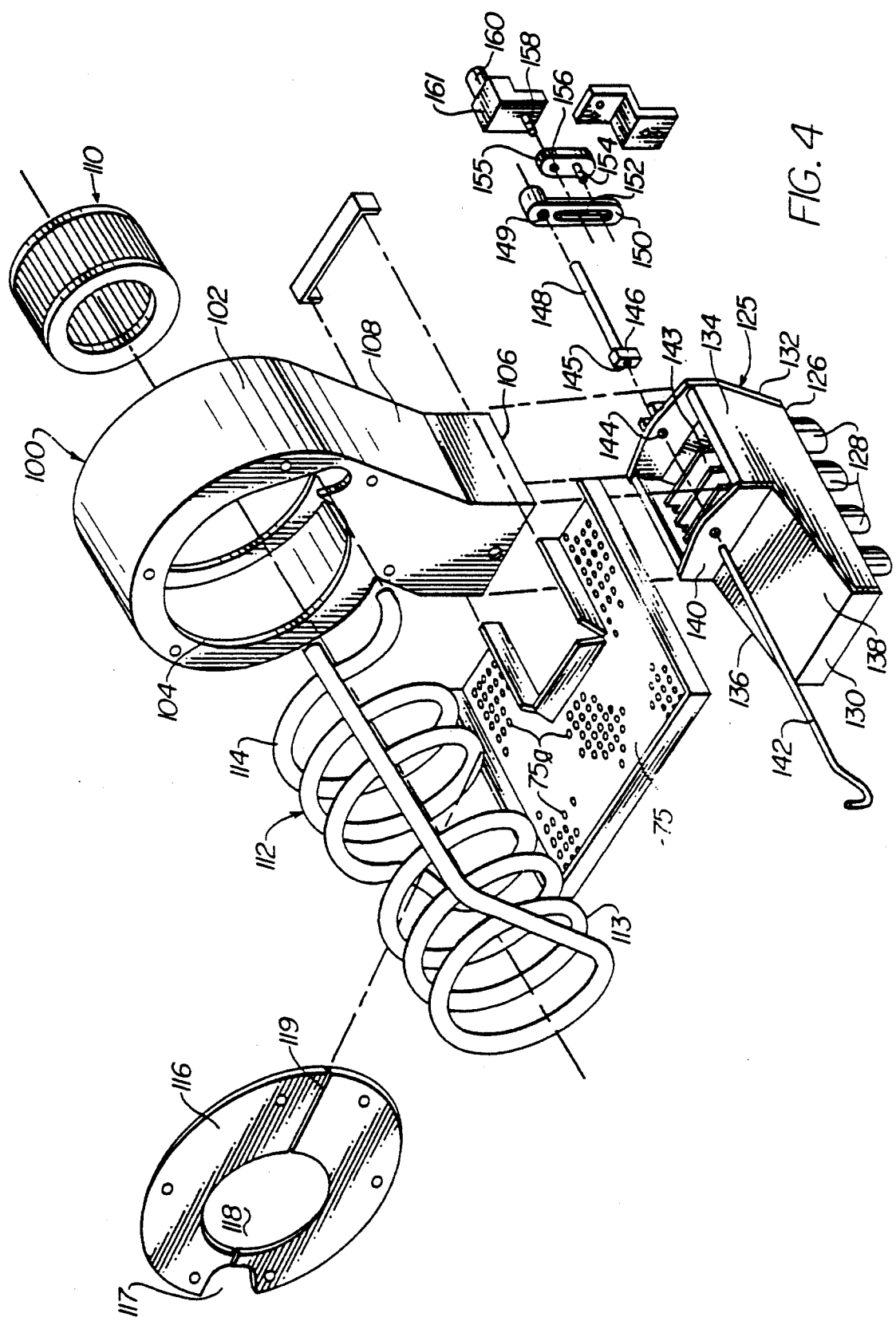
FIG. 4 is an exploded perspective view of the air dispensing apparatus.

Referring to FIGS. 2, 3 and 4 of the drawing, air circulating apparatus generally designated by the numeral 100 comprises a blower housing 102 having an inlet opening 104 and a discharge opening 106. As illustrated in FIGS. 2 and 4, blower housing 102 is in the form of a volute and a plenum section 108 is formed adjacent the discharge opening 106.

A radial flow fan impeller 110 draws air axially through inlet opening 104 and discharges air radially through plenum section 108 and discharge opening 106.

A heating element 112 having coils 113 of a first stage and coils 114 of a second stage is mounted for heating air drawn into the blower housing 102.

As best illustrated in FIG. 3 of the drawing, the interior of the cabinet 70 is divided by a perforated plate 75 to form an air conditioning chamber 115 and a cooking chamber 120. Perforated plate 75 is constructed of a metallic material and has perforations 76a with relatively small openings equivalent to more than 50% of the surface area. The perforated metal sheet 75 prevents microwave energy from passing into the air conditioning chamber 115.

As best illustrated in FIG. 3 of the drawing, the first stage of coils 113 is mounted in air conditioning chamber 115 outside of the blower housing 102 while the second stage of coils 114 is mounted inside blower housing 102. Terminals 112a and 112b of heating element 112 are connectable to a suitable source of electricity.

As illustrated in FIG. 4 of the drawing, a mounting plate 116 having a notch 117 formed in the periphery thereof and a central opening 118 is bolted or otherwise secured to blower housing 102 for supporting heating element 112. Plate 116 is formed in two parts which are connectable along a part line 119.

As illustrated in FIG. 3, blower 110 is mounted on a shaft which is driven through a coupling 111 by a motor 110a.

Coils 109 of a third stage heating element 109 is mounted in the plenum section 108 of blower housing 102 and positioned such that air delivered radially from blower 110 is heated immediately prior to being delivered through discharge opening 106. It should be readily apparent that only coils 109 may be activated while coils 113 and 114 are idle, if it is deemed expedient to do so depending upon the heating requirements of a particular food product.

An air dispensing duct generally designated by the numeral 125 is secured to plenum 108 for receiving air from discharge opening 106.

As best illustrated in FIGS. 3 and 4 of the drawing, air dispensing apparatus 125 comprises a tapered duct formed by a perforated plate 126 having an array of passages formed therein which communicate with tubes 128. A front wall 130 and a rear wall 132 extend upwardly from the perforated plate 126 and are connected between side walls 134 and 136. An inclined top wall 138 extends between front wall 130 and a flange 140 encircling the lower end of plenum 108 and enclosing the discharge opening 106 from the blower housing 102.

As illustrated in FIG. 3 of the drawing, air directing vanes 143 extend between side walls 134 and 136 of the tapered duct for distributing air along the length of the interior 144a of the tapered duct.

The air dispensing apparatus 125 is pivotally secured to duct plenum 108 by a pivot pin 142 extending through aligned apertures 144 in flange 140. Pivot pin 142 extends into an opening 145 formed in lug 146 on shaft 148 which extends into an aperture 149 on a link 150. Link 150 has an elongated slot 152 formed therein into which a pin 154 on crank 155 extends.

Crank arm 155 has an aperture which receives a drive shaft 158 driven by motor 160 through a gear reducer 161.

A radial blower 110 discharging its highest velocity air from the outer portion of the volute downwardly through shaped openings in tubes 128 to impinge upon a narrow food product 30 in the open top container 18.

Figure 11:
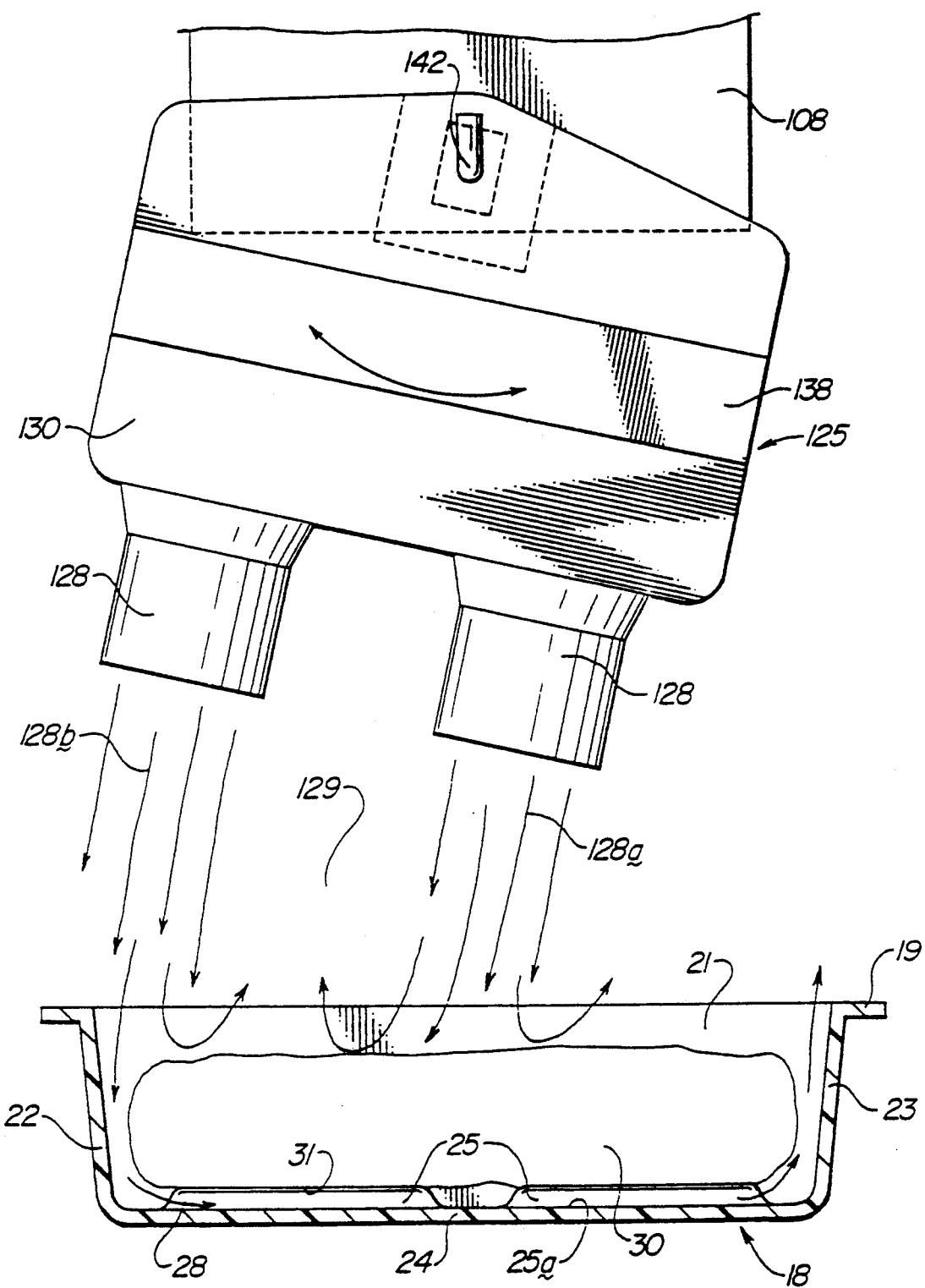
FIG. 11 is a diagrammatic view illustrating air flow during a first stage of the cooking process.
Figure 12:
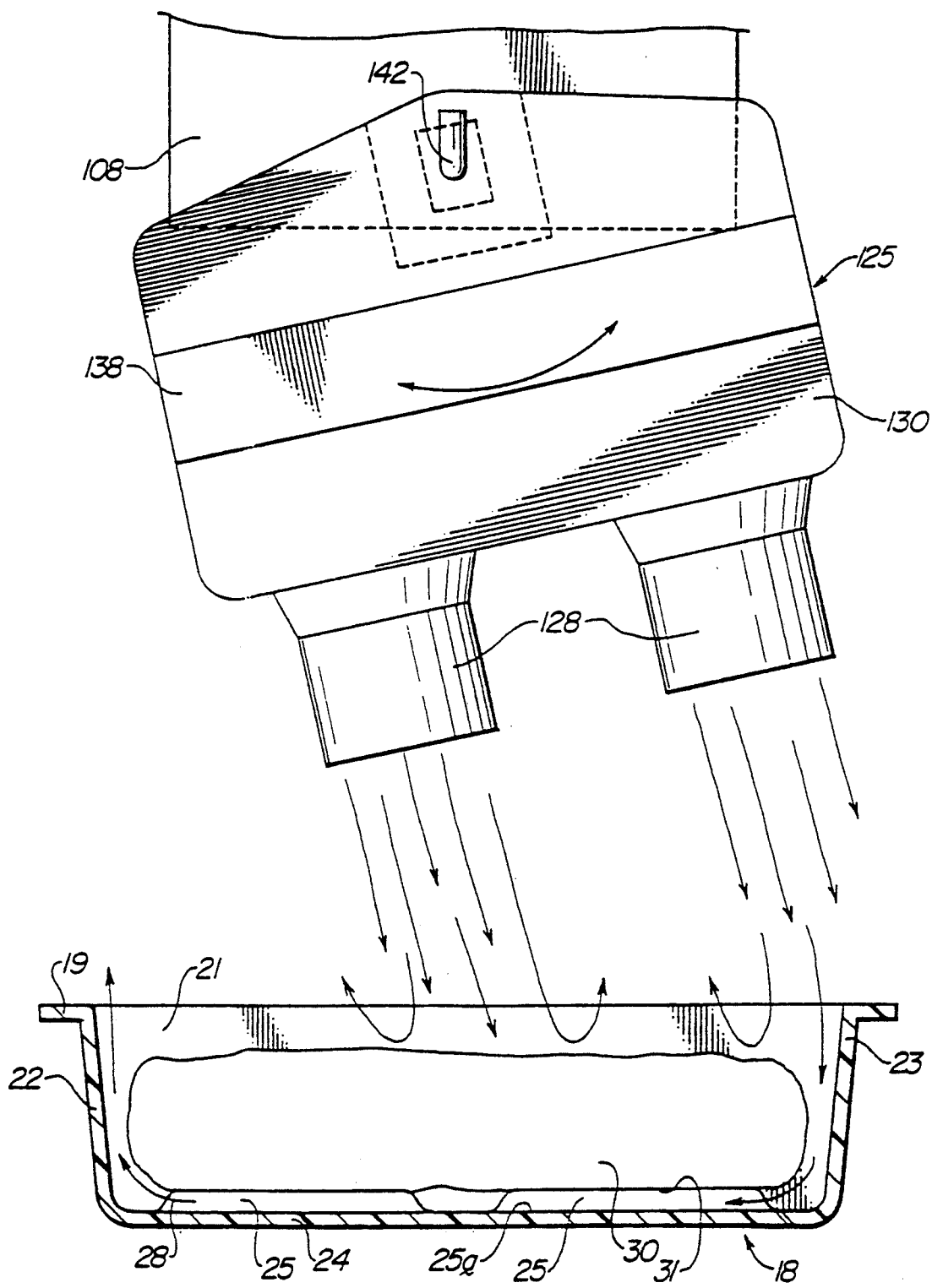
FIG. 12 is a diagrammatic view similar to FIG. 11 illustrating air flow during a second stage of the cooking process.

The air dispensing duct 125 is moved relative to the product 30 to give uniform coverage by the air streams. As best illustrated in FIGS. 11 and 12, the sides 22 and 23 of the container 18 cause a portion of the air stream to be deflected to heat the sides and bottom 31 of product 30 in the container. The movement applies the air streams near one side of the container adjacent end wall 22 and then to the other side adjacent end wall 23 so that parts of the air streams ar alternately applied to opposite exposed sides of the product 30 and are caused to alternate the lateral flow through loose stacks of food products 30 such as curled or random lengths of french fried potatoes. This alternating lateral air flow through paths 28 between support ribs 25 passes under and heats the lower side 31 of irregularly shaped products such as bone-in chicken parts.

The effectiveness of the sideways air heating of lower surfaces 31 can be enhanced by ribs 25 to provide air passages under flat products.

Further, the moving air dispensing apparatus 125 provides moving reflective surfaces which serve as stirrers to help distribute the microwave energy in the cooking chamber 120.

The combination of extended orifices through tubes 128, and the open top container 18 provides air escape path 129 while bringing the orifice to an optimum distance from the product 30. It should be noted that upper edges of the sides 20 and 21 and ends 22 and 23 of container 18 extend above the height of the contained product 30 to enhance air flow between the lower surface 31 of the product 30 and the bottom 24 of container 18.

As illustrated in FIG. 2 of the drawing, streams of air dispensed from air dispensing duct 125 through hollow air dispensing tubes 128 impinge upon the upper surface of a food product 30 in container 18. The spent air travels through space 129 between tubes 128, as illustrated in FIGS. 11 and 12 of the drawing. Spent air travels upwardly adjacent baffles 162 and is then directed downwardly by a curved surface 164 along a path between baffle 162 and baffle 166 downwardly toward soil collector pans 165. Soil collector pans 165 are preferably removably mounted and are maintained at a temperature which is less than the temperature of any other surface in the oven 70 for causing very fine smoke-type particles in the moving air to be collected on the coldest surface in the recirculating path. From soil pans 165 the recirculating air is directed upwardly between the outer surface of baffle 166 and sheet 74b of side wall 74 upwardly through passages formed in the perforated plate 75.

Baffles 162 and 166 are preferably constructed of material which is relatively transparent to microwave energy. To assure that the soil collection pans 165 are maintained cooler than other surfaces in oven 70, the pans may be exposed to outside air or water cooling to facilitate collecting aerosol from the recirculating air.

From the foregoing it should be readily apparent that the disclosed method for controlling the temperature and surface texture of a food product which is to be delivered from vending machine 200 generally comprises delivery of a suitably packaged and preserved food product from a storage compartment 170 to an oven 70. The package 10 is positioned by back stop member 45 in a predetermined relationship relative to electromechanical linear actuators 50 and 60 and relative to access opening 79 communicating with cooking chamber 120 in oven 70.

Actuation of the actuator of the loading device 50 results in movement of push plate 57a through tubular sleeve 12 for pushing container 18b out of sleeve 12 and into the cooking chamber 120. Streams 28a of air delivered through tubes 128 of the air circulating apparatus 100 melts and shrinks film 27a for uncovering food product 30 in the open top container 18b.

In the embodiment illustrated in FIG. 15 of the drawing, one or more air streams 128a, after causing the food product 30a in container 18 to be uncovered will be delivered through the open top of container 18b. If the food product 30a in the container is strips or slices of pasta, potatoes or other particulate material, air from stream 128a will be delivered through the stacked material in heat transfer relation with the surface of the pieces of the food product.

If food product 30 is a solid article as designated by the numeral 30 in FIGS. 11 and 12 of the drawing, air dispensing duct 125 is preferably rocked causing air streams 128a and 128b to move across the surface of the food product between lateral edges thereof such that regions of controlled air pressure are alternately formed adjacent opposite sides of the product 30 such that temperature controlled air flows through passage 28 between the lower surface 31 of the food product and the upper surface 25a of the bottom 24 of container 18.

After the surface of the food product 30 has been heated by air streams 128a and 128b, the recirculating air tends to limit localized heating of the product by microwave energy delivered by magnetrons 92. Tips, and thin areas of the product which are rapidly heated by the microwave energy may actually dissipate heat to air in streams 128a and 128b to provide cooling to certain portions of the food product.

After the food product 30 in container 18 has been sufficiently heated, air flow through the air circulating apparatus 100 is terminated, magnetrons 92 are turned off and blower actuator 82 is energized for moving the door upwardly to the position illustrated in FIG. 1 of the drawing. The electromechanical actuator of the container unloading device 60 is then actuated for moving rake plate 57b from the dashed outline position in FIG. 5 of the drawing to the full outline position. Rake plate 57b is then lowered and retracted for moving container 18 out of the oven and redepositing the hot container and the food therein in the tubular sleeve 12.

After the heated food product and container 18 have been moved into the protective tubular sleeve 12, conveyor 65 is energized for moving the heated food product toward the delivery passage 224 of the vending machine 200 such that the product is accessible to the customer by opening protective door 225.

SECOND EMBODIMENT

Figure 22:
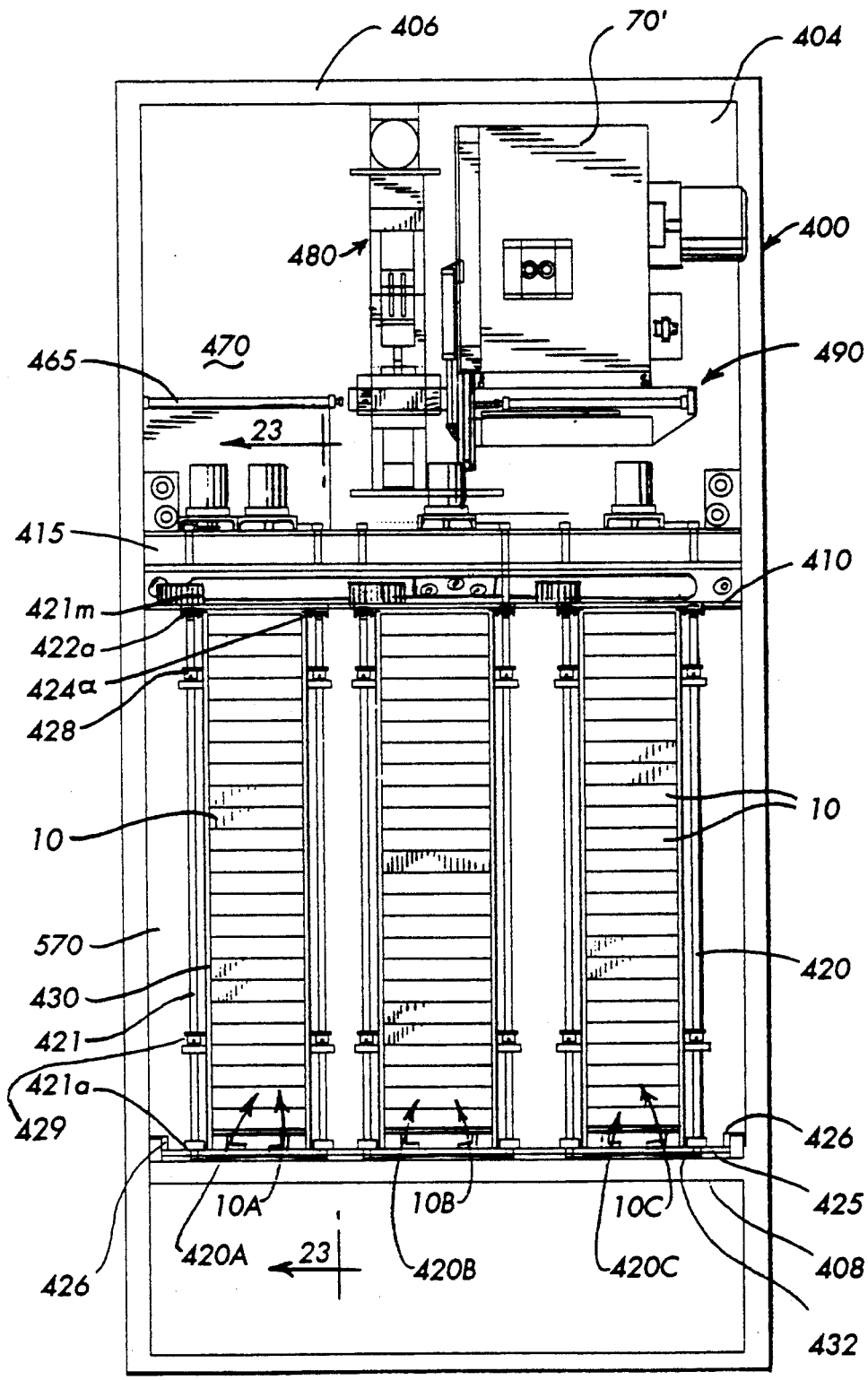
FIG. 22 is an elevational view of the interior of a second embodiment of the vending machine with the front door panel removed.

A second embodiment of the vending machine is illustrated in FIGS. 22-21 of the drawings. The vending machine 400 is mounted in an enclosure cabinet having a back wall 401, spaced side walls 402 and 404, a front panel 405, a top wall 406, and a bottom wall 408. The front panel 405 is preferably hingedly secured to side wall 402 and provided with a key actuated lock securing the front panel 405 in a closed and locked position to prevent unauthorized access to the interior of the enclosure.

The structure of the oven 70' of the second embodiment is substantially the same as that of the preferred embodiment hereinbefore described. A modified inventory management system, which as will be hereinafter more fully explained, comprises a shuttle system 420, an elevator system 440, and a stager system 450, a picker system 480, a desleever system 465 and a resleever system 490 is employed to move a selected package from the refrigerated storage compartment to the oven 70' and to dispense the heated food in the package.

As illustrated in FIG. 22 of the drawing, a partition wall 415 separates the interior of vending machine 400 to provide an oven cavity 470 containing an oven 70' and a picker system 480 above a refrigerated food storage chamber 570 which houses a portion of the inventory management system generally comprising shuttle system 420, elevator system 440 and staging system 450.

SHUTTLE SYSTEM

The shuttle system 420, in the illustrated embodiment, is formed by a plurality of chain driven shuttle conveyors adapted to move stacks of packages 10A, 10B and 10C of food product. In FIG. 22, three substantially identical shuttle conveyors 420A, 420B and 420C make up the shuttle system 420.

Each shuttle conveyor 420A, 420B, and 420C is mounted on a shuttle bottom support plate 425 having drawer slides 426 adjacent sides thereof for movably supporting shuttle system 420 between side walls 402 and 404 of the cabinet of the vending machine 400. A shuttle top support plate 410, extending across the upper end of the shuttle system 420 and above shuttle conveyors 420A, 420B, and 420C, provides a support surface to receive packages 10 from elevators 440 and supports the package as it is moved by a staging system 450 to a position for removal from the storage chamber 570.

Each shuttle conveyor 420A, 420B, and 420C is formed by four generally vertically extending shafts 421, 422, 423, and 424 having upper and lower ends mounted in bushings 421a, 422a, 423a, and 424a in top support plate 410 and bottom support plate 425, two of the shafts 421 and 422 being positioned adjacent each side of a horizontally extending path along which a stack 10A of packages 10 is moved.

Each shaft 421–424 has an upper sprocket 428 and a lower sprocket 429 secured thereto around which upper and lower shuttle drive chains 428a and 429a extend to form upper and lower sprocket and chain sets. Channel shaped horizontally extending wear bars 422c extend between shuttle shafts 421 and 422 to form a strong rigid construction for supporting the sprocket and chain sets in vertically spaced relation.

Spaced paddles 430 and 431 are secured between chains 428a and 429a to engage opposite sides of the rear edge of packages 10 forming stacks 10A, 10B and 10C of packages 10 of food products as illustrated in FIG. 22 of the drawing.

A shuttle drive motor 421m, on the upper surface of top support plate 410, is drivingly connected to shuttle drive shaft 421. Crossed belts 432 extend around pulleys on lower ends of drive shafts 421 and 423. If motor 421m rotates shaft 421 in a counterclockwise direction, force is transmitted through the crossed belt 432 for rotating shaft 423 in a clockwise direction such that paddles 430 and 431 move in the same direction and are maintained in a horizontally spaced parallel relationship. The lowermost package in each stack 10A, 10B and 10C of packages 10 is supported on spaced rails 425' extending upwardly from shuttle support plate 425.

In the illustrated embodiment in FIG. 22 of the drawing, three substantially identical shuttle conveyors 420A, 420B and 420C are illustrated. Each shuttle conveyor preferably carries packages 10 of different food products. It should be readily apparent that three or more shuttle conveyors may be employed if it is deemed expedient to do so. Further, each shuttle conveyor may carry packages of the same or different product.

From the foregoing it should be readily apparent that each of the shuttle conveyors 420A, 420B and 420C is supported on shuttle support plate 425 mounted on drawer slides 426 to provide a drawer-like mounting system permitting horizontal movement of the shuttle system 420 to facilitate loading stacks 10A, 10B and 10C of packages 10 in the respective shuttle conveyors.

Figure 23:
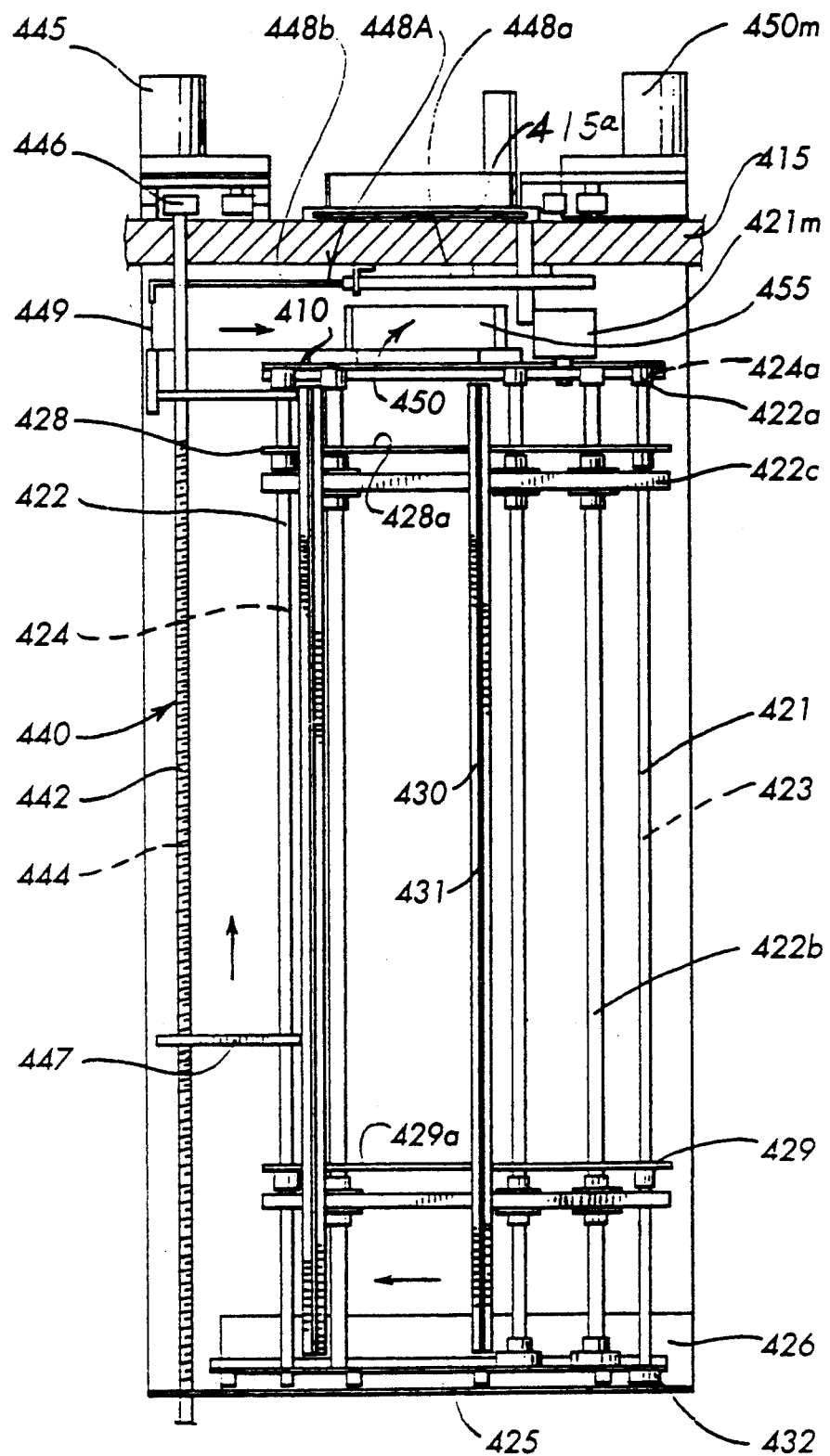
FIG. 23 is a cross-sectional view taken across line line 23—23 of FIG. 22.

In the particular embodiment of the shuttle system 420 illustrated in FIGS. 22 and 23 of the drawing, paddles 430 and 431 are horizontally spaced to permit two stacks of packages to be positioned on each shuttle conveyor 420A, 420B and 420C. As will be hereinafter more fully explained, stacks of packages on conveyors 420A, 420B and 420C are inactive stacks of packages which will be moved onto an elevator system 440 after the last package in an active stack on the elevator system has been removed from the elevator system.

ELEVATOR SYSTEM

An elevator system 440 comprises a plurality of elevator assemblies 440A, 440B, and 440C positioned adjacent the discharge end of each shuttle conveyor 420A, 420B, and 420C. Each elevator assembly 440A, 440B, and 440C comprises an elevator plate 447, motor 445, and a pair of threaded vertically extending lead screws 442 and 444 rotatably supported between the partition wall 415 and bottom wall 408 of the refrigerated food storage chamber 570. An elevator motor is operably connected through a gear box to elevator lead screws 442 and 444. The elevator plate 7 is threadedly secured to elevator screws 442 and 4 such that rotation of the elevator screws moves the elevator plate 447 vertically along elevator screws 442 and 444. The lead screws 442 and 444 are driven in parallel by motor 445 to lower and raise the elevator plate 447.

Each elevator assembly 440A, 440B, and 440C is associated with a destacker system 448 positioned above each stack of food products and horizontally supported by brackets 441a and 441b from the lower surface of partition 415 of the refrigerator compartment. Each destacker assembly 448A, 448B, and 448C of the destacker system 448 comprises an air cylinder 448a and a destacker paddle blade 449 mounted to the rod of an air cylinder 448a. The paddle blade 449 extends down from the rod and has a bend at its edge to make line contact with a package 10. This bend increases the stiffness of the paddle blade. After a package 10 is in position at the top of an active stack on one of the elevator assemblies 440A, 440B, and 440C, the destacker air cylinder 448a, for the indexed stack, is activated to retract thereby causing the destacker paddle 449 to slide the selected package 10 into the waiting basket 455 of the staging system 450. Once the selected package is positioned in the basket 455 and on the shuttle support plate 410, the destacker cylinder 448a resumes its normal extended position.

Once a selection is made and the destacker cylinder 448 has moved the selected package into the basket and the rod has returned to the extended position, the elevator motor 445, for the appropriate active food stack, is activated to raise the elevator plate 447 and the active food stack toward the bottom of the top of the compartment such that the top package is level with the upper surface 412 of top support plate 410 along which the staging basket 445 moves the selected package.

STAGING SYSTEM

Figure 24:
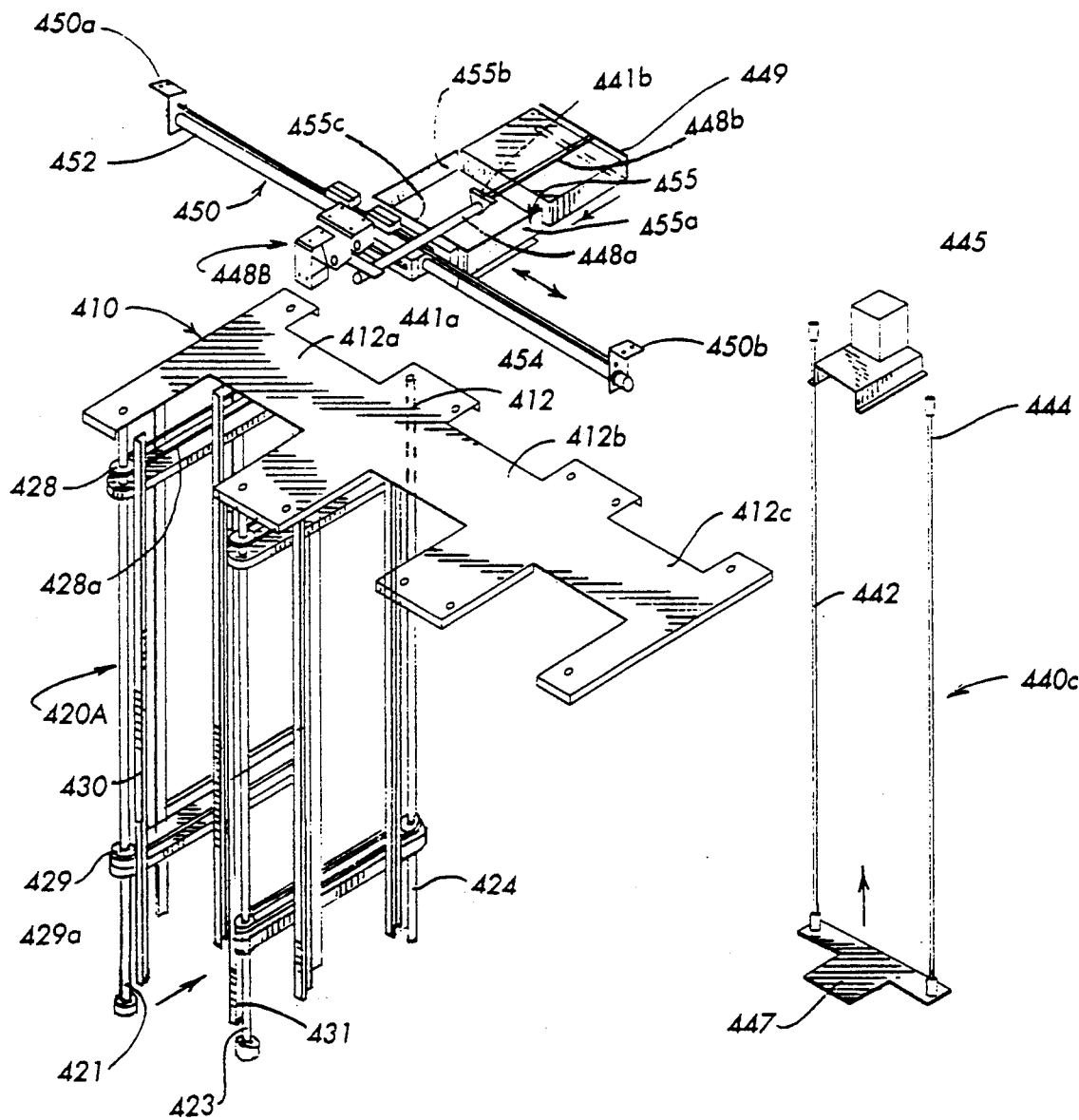
FIG. 24 is a diagramatic exploded perspective view of a portion of the product handling system.
Figure 25:
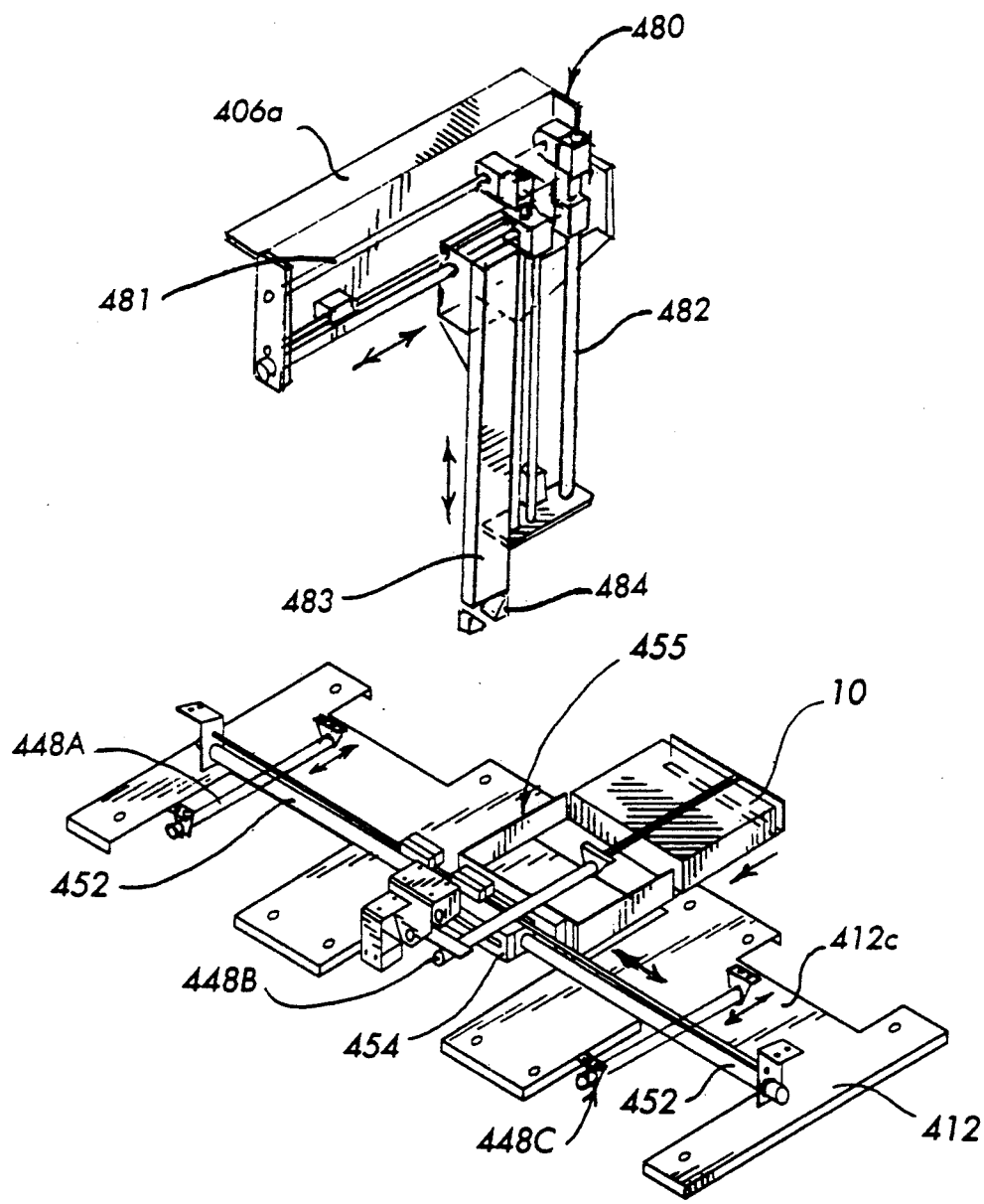
FIG. 25 is a diagramatic exploded perspective of the picker and the shuttle systems.

The staging system 450, best illustrated in FIGS. 24 and 25, includes a staging basket 455 carried by a mounting block 454 longitudinally of an air cylinder 452. The air cylinder 452 is supported by brackets 450a and 450b attached to the lower surface of partition 415 and has a piston moved by air pressure through the bore of the cylinder.

Mounting block 454 has a passage formed therein through which cylinder 452 extends. A magnetic coupling between the piston in cylinder 452 and mounting block 454 transmits force through the cylinder wall to cause mounting block 454 to move in unison with the piston. The staging system 450 is suspended above the shuttle system 420 toward the top of the refrigerator compartment 570 and runs along the shuttle top support plate 410 adjacent the elevator system above each of the stacks. The upper surface 412 of the shuttle top support plate 410 provides a path across which the selected package translates.

The staging basket 455 is constructed of sheet metal formed in the shape of a channel, with two flanges 455a and 455b separated a distance slightly larger than the width of the food package 10 and connected by a web 455c. The ends of the flanges 455a and 455b are bent away from the center of the basket 455 to form guide surfaces which converge toward the entrance into n the basket between flanges 455a and 455b. When a package 10 is not properly aligned with the basket 455, the destacker 448 will slide the package toward the basket into engagement with one of the guide surfaces which will apply a lateral force which will move the package in alignment with the basket.

As illustrated in FIG. 24, the web 455c forms the back of the basket and is mounted to a mounting block 454 which translates along the outer surface of cylinder 452. The mounting block 454 is provided with a magnet which is attracted to a magnet located inside the piston in air cylinder 452. The position of the basket 455 is controlled by the location of the magnet inside the piston which, in turn, is controlled by air pressure applied to it through either end of the cylinder. Air pressure applied at one end will cause piston and the magnetic coupling to translate toward the other end. The magnet will stop when the air pressure on the forcing side is counterbalanced by air pressure applied at the other end.

The location of the basket 455 is determined by the location of the piston whose position is detected by limit switches, one for each desired position 412a, 412b, and 412c of the basket 455; underneath the window, in front of the left stack, in front of the middle stack, and in front of the right stack. When the appropriate limit switch is activated the air to the piston is shut off, causing the basket 455 to stop.

Once the package is in the basket 455 and the piston 450p has caused the basket to translate into the position underneath the window 415a of the partition 415 between the freezer 570 and oven cavity 470, the window 415a is opened by an air cylinder. After the window is opened, the picker system 460 is activated to lower the gripper 464 through the window to grab the package 10.

PICKER SYSTEM

Figure 26:
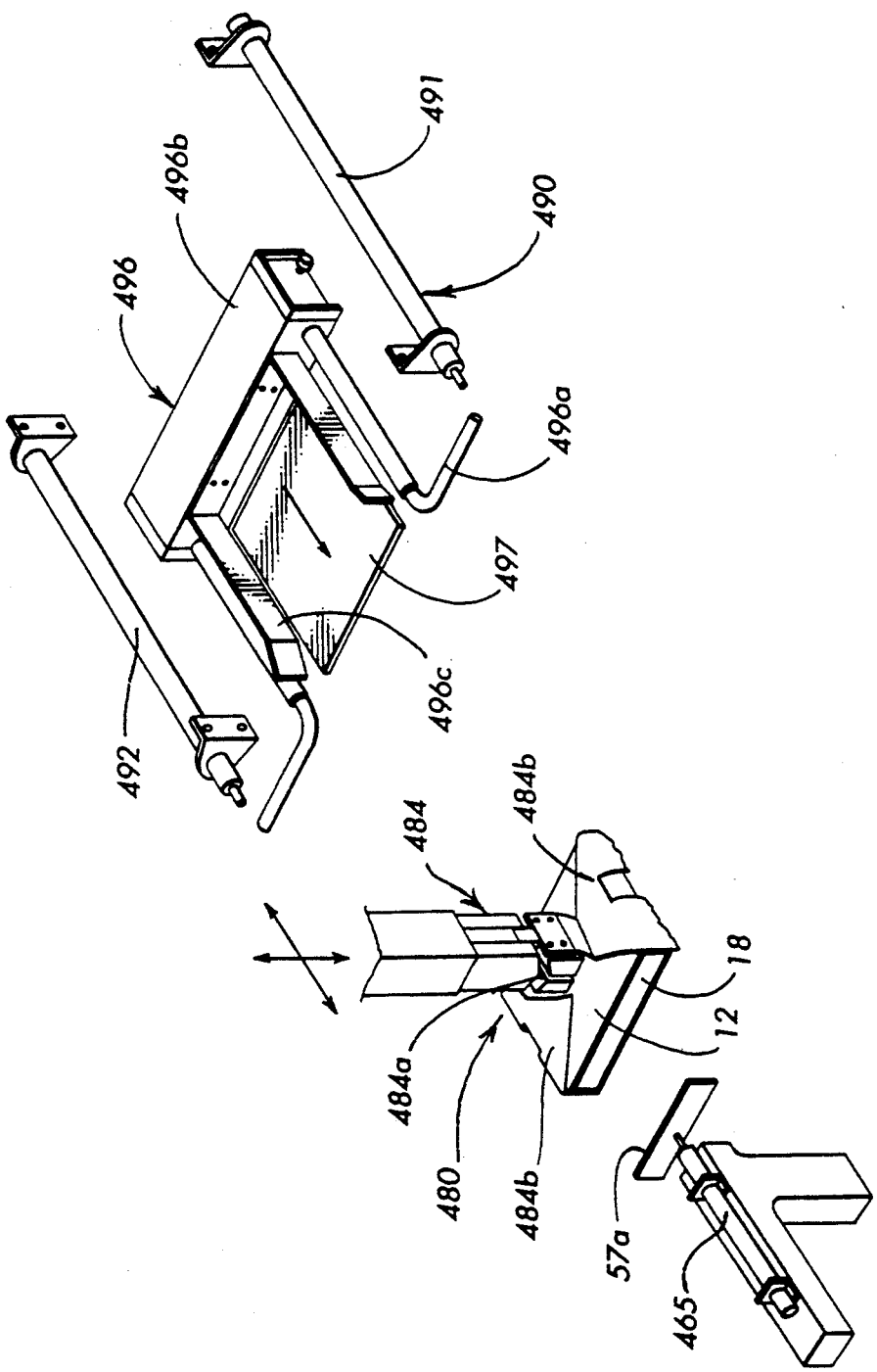
FIG. 26 is a diagramatic view of a package gripper and associated loading and unloading apparatus.

The picker system 480 best illustrated in FIGS. 25 and 26 of the drawing, is located in the oven cavity 70 and is supported off the top wall 406 above partition wall 415 in the oven cavity 470 by a bracket 06a. The picker system 480 is formed by electrically driven lead screws 481 and 482, one operating in the vertical plane and the other operating in the horizontal plane, a gripper arm 483, and a pneumatic gripper 84. Lead screw 482 is mounted on a carriage which moves horizontally along lead screw 481.

The pneumatic gripper 484 best illustrated in FIG. 26, is made up of stainless steel paddles 464b attached to the sides of two blocks 484a which are driven by small cylinders located between the two blocks 484a. When the cylinders in the blocks 484a extend, the two blocks 484a separate causing the gripper paddles 484b to open. With the paddles open the gripper can be lowered through the window 415a in partition 415 onto the package 10. Once the package is straddled by the gripper 484, the cylinders then retract causing the paddles 484b to close and grab the package.

After the package 10 is grabbed, the vertical lead screw 482 rotates lifting the package out of the refrigerator compartment 580 through the window 415a and into the oven cavity 470. The window air cylinder then is activated to close the window in the partition.

As illustrated in FIG. 26, the package 10 is held in front of the oven by the picker 484 at which time the oven door, which is operated by an air cylinder, is opened to receive the selected food tray 18 for cooking. The food tray 18 is separated from its cover sleeve 12 by a de-sleever cylinder 485 which is horizontally mounted in front of the oven cavity 470. The de-sleever cylinder 485 is positioned such that when it extends it pushes the tray 18 out of its cover 12, which is still held by the gripper 484, into the oven and onto a tile surface 497 in the bottom of the cooking chamber. Once the food tray 18 is inside the oven, the de-sleever 485 retracts to its normal retracted position and the oven door closes so that the cooking process can begin. The tile 497 absorbs microwave and functions as a heat sink to provide bottom heat to the food in tray 18. The layer of susceptor material 27, illustrated in FIG. 9, in the bottom of tray 18 also functions as a heat sink to provide bottom heating For details on the oven and cooking process refer to the first embodiment.

RE-SLEEVER ASSEMBLY

Once the food is ready and the oven door is opened, the tray 18 is removed from the oven and placed back in its cover 12 by the re-sleever assembly 490. The re-sleever assembly 490 comprises a pair of air cylinders 491 and 492 mounted on either side of the oven and a U-shaped carrier 496. The U-shaped carrier 496 has a base 496b, an inner U-shaped package guide member 496c constructed of thin sheet metal mounted to the base 496b, such that the inner U-shaped package guide member 496c is in the same plane as the larger U-shaped carrier frame 496; and two back-to-back L-shaped rod arms 496a attached to the base 496b and which extend through the oven to connect with the re-sleever cylinders 491 and 492 located on either side of the oven. In addition, the arms of the inner U-shaped member's arms have bends at their ends to serve as guides for the arms when they contact the gripper.

The re-sleever device 496, which remains in the oven while the food is cooking, operates to push the food tray 18 out of the oven and back into the cover 12 which is still in t he paddles 484b of the gripper 484. In order to slide the tray all the way into the cover 12, the outer U-shaped carrier device 496 is wider than the package guide 496c, which grips the package 10 when the gripper is in the closed position. The inner U-shaped guide member 496c, although only slightly wider than the gripper 494, is flexible to allow the arms to spread slightly as it slides the tray 18 back into sleeve 12 held by the gripper 484.

When the inner U-shaped member 496c pushes the tray 18 and the bent guide ends of the arms make contact with the gripper 464, a lateral force separates the two arms of the inner U-shaped member 466c allowing the arms to slide along the sides of the gripper 464 so that the tray is slid all the way back into the cover sleeve 12.

With the food heated and the tray 18 back in the package cover 12, the package is ready to be delivered to the customer. The horizontal lead screw 481 of the picker system 480 is activated to extend, positioning the package in front of the delivery chute, and the cylinders in the steel blocks extend thereby releasing the package 10 from the gripper paddles 484b for delivery down the chute.

We claim:

1. Package handling apparatus for movign a package from a refrigerated compartment comprising: package support means; a plurality of horizontally movable conveyors, each of said horizontally movable conveyors being adapted to carry a plurality of inactive stacks of packages; a plurality of elevators for supporting a plurality of active stacks of packages each of said elevators being positioned adjacent an end of one of said horizontally movable conveyors, the horizontally movable conveyors moving the inactive stacks of packages onto said elevators where they become active stacks of packages; means associated with each elevator for removing a package from an active stack of packages on one of said elevators and to deposit the removed package on said package support means.

2. Package handling apparatus according to claim 10, said elevator means comprising: a platform adapted to support a stack of packages; and means moving said platform vertically.

3. Package handling apparatus according to claim 11, said means for moving the platform vertically comprising: a pair of vertically extending rods; and means for securing one of said vertically extending rods to each side of said platform whereby movement of said rods imparts vertical movement to said platform.

4. Package handling apparatus according to claim 1, each of said plurality of horizontally moving conveyors comprising: pusher means engageable with a stack of packages; and means moving said pusher means.

5. Package handling apparatus according to claim 1, with the addition of package engaging means; carrying means for carrying said pacakge engaging means in a first direction; means movably securing said package engaging means to said carrying means; and means for mounting said carrying means for moving said carrying means in a second direction.

6. An apparatus for moving stacks of packages in a storage compartment so that the stacks of packages are removed from the storage compartment in a same sequence in which the stacks of packages were loaded into the storage compartment, the apparatus comprising: a storage compartment having a side door for loading stacks of packages into the compartment and having a top door movable to permit removable of a package from the top of a stack of packages within said storage compartment; elevator means for indexing a stack of packages toward the top of said storage compartment so that the topmost package of the stack on said elevator means is removed through said top door of said storage compartment; and shuttle means fo indexing the stacks of packages loaded through said side door into said storage compartment toward said elevator means after the last package of the stack on said elevator means has been removed through the top door of said storage compartment, whereby the stacks of packages are moved to said elevator means in the same sequence in which the stacks of packages were loaded into said storage compartment.

7. The apparatus according to claim 6, said elevator means comprising: a platform adapted to support the bottom package of a stack of packages; and means for raising and lowering said platform.

8. The apparatus according to claim 7, said means for moving said platform comprising: a pair of vertically extending rods; and means for securing one end of each of said vertically extending rods to each edge of said platform wherein the movement of said rods imparts vertical movement to said platform.

9. The apparatus according to claim 6, said shuttle means comprising: pusher means engageable with a stack of packages; and means for horizontally moving said pusher means.

10. The apparatus according to claim 6, wherein said storage compartment is insulated and refrigerated.

11. The apparatus according to claim 6, wherein a plurality of sets of elevator means and shuttle means are included within said storage compartment, whereby stacks of packages on each shuttle means are indexed onto its corresponding elevator means.

12. The apparatus according to claim 11, further comprising: staging means for moving the topmost package of a stack of packages on one of said elevator means to a postiion adjacent said top door of said storage compartment; and control means for selecting which package said staging means moves adjacent said top door of said storage compartment.

13. The apparatus according to claim 12, wherein said staging means comprises: a basket; a means for moving said basket between a position adjacent the topmost package of the stack of packages on said elevator means and a position adjacent said top door of said storage compartment; and a means for moving the topmost package of the stack of packages on said elevator means into said basket when said basket is in the position adjacent said the topmost package of the stack of packages on said elevator means.

14. The apparatus according to claim 6, further comprising: picker means for removing a package from said storage compartment when the package is positioned adjacent said top door of said storage compartment and moving the package adjacent to a cooking apparatus for transfering heat to the package, said cooking apparatus being spaced from said storage compartment to minimize heat transfer between the interior of said storage compartment and said cooking apparatus when said top door of said storage compartment is opened for said picker means to remove a package.

15. The apparatus according to calim 14, wherein said picker means comprises: a gripper arm; gripper paddles; means for opening and closing said gripper paddles so that said gripper paddles grip and release a package; means for raising and lowering said gripper arm so that said gripper paddles reach through said top door of said storage compartment; and means for opening said top door of said storage compartment when said gripper paddles reach into said storage compartment.

16. The apparatus according to claim 14, further comprising: means for removing said package removed from said storage compartment and moving said package into said cooking apparatus.

17. The apparatus according to claim 16, said packages comprising: a sleeve; an inner container for a food product; and a food product, said inner container being suitable for processing in said cooking apparatus with said food product.

18. The apparatus according to claim 17, said means for removing said package removed from said storage compartment and moving said package into said cooking apparatus comprising: means for pushing said inner container out of said sleeve and into said cooking apparatus.

19. The apparatus according to claim 17, further comprising: resleever means for retrieving said inner container from said cooking apparatus and resleeving said inner container into said sleeve.

20. The method of moving stacks of packages in a storage compartment so that the stacks of packages are removed from the storage compartment in a same sequence in which the stacks of packages were loaded into the storage compartment, the method comprising the steps of:

positioning inside a storage compartment at least one elevator means for indexing a stack of packages so that the topmost package of the stack is removed through a first door of the storage compartment;

for each elevator means, positioning inside the storage compartmetn a shuttle means for indexing stacks of packages onto the elevator means;

loading stacks of packages onto the shuttle means inside the storage compartment through a second door in the storage compartment;

indexing the stacks of packages onto the elevator means in the same sequence in which the stacks of packages were loaded into the storage compartment;

removing the topmost package from the stack of packages on the elevator means through the first door of the storage compartment;

indexing the stack of packages on the elevator means as the packages on the elevator means are successively removed; and indexing the stacks of packages onto the elevator means in the same sequence in which the stacks of packages were loaded into the storage compartment as the stacks of packages are successively removed.

21. Package handling apparatus for moving a package from within a storage compartment ot a staging position, said apparatus comprising: a plurality of elevators, for vertically moving stacks of packages; a destacker assembly for movign a package form one of the stacks of packages on said elevators to a staging assembly, said staging assembly for moving said package to a staging position; and a plurality of conveyors, each of said conveyors being positioned adjacent to one of said elevators and being adpated to carry at least one stack of packages to said elevator, the conveyors successively moving stacks of packages to said elevators as said destacker assembly depletes the stacks of packages on said elevators.

22. The package handling apparatus of claim 21, wherein said destacker assembly is positioned adjacent the top of the stacks of packages on said elevators whereby said destacker assembly is adapted for moving a package from the top of the stacks of packages on said elevators.

23. The package handling apparatus of claim 21, with the addition of a picker assembly for moving said package from the staging position.

24. The package handling apparatus of claim 21, wherein the staging position is located inside the storage compartment and adjacent to a door of the compartment whereby said package is accessed through the door and removed from the compartment.

25. The package handling apparatus of claim 24, with the addition of a picker assembly for reaching through the door of the storage compartment and moving said package from the staging position to a location outside of the storage compartment.

* * * * *

UNITED STATES PATENT AND TRADEMARK OFFICE
CERTIFICATE OF CORRECTION

PATENT NO. : 5,210,387　　　　　　　　　　　　　Page 1 of 3
DATED　　　: May 11, 1993
INVENTOR(S) : Donald P. Smith, et al It is certified that error appears in the above-indentified patent and that said Letters Patent is hereby corrected as shown below:

Column 1, line 16, after "BACKGROUND" insert --OF--.

Column 1, line 46, after "Pat. No." insert --3,884,213; U.S. Pat. No. 4,154,861; U.S. Pat. No.--.

Figure 13:
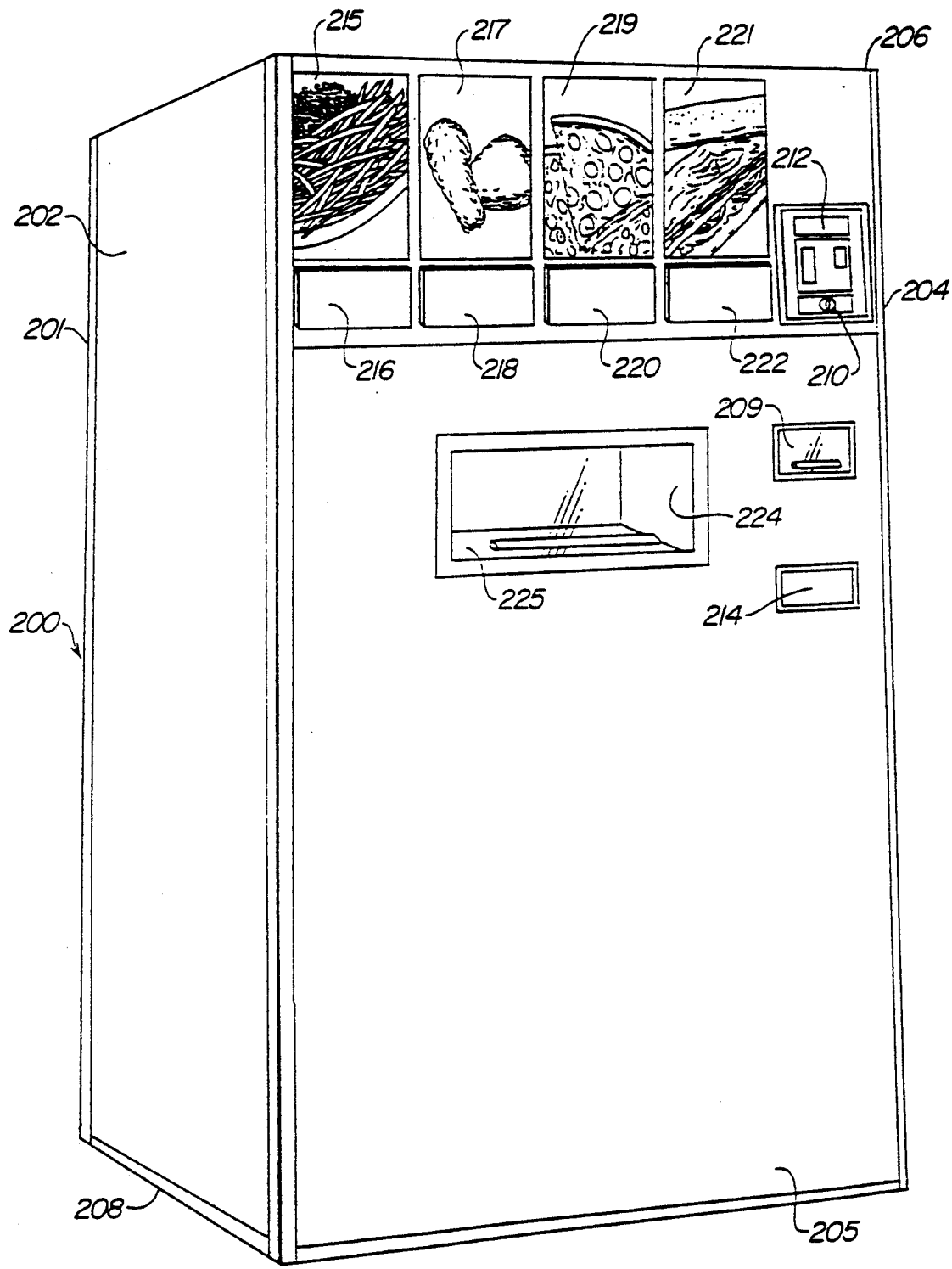
FIG. 13 is a perspective view of the external vending machine cabinet.

Column 3, line 28 change "As best illustrated in FIG. 3" to read --As best illustrated in FIG. 13--.

Column 3, line 30, change "hot food products 0" to read --hot food products 30--.

Column 6, line 29, after "product" insert --30--.

Column 10, line 40, change "ar" to read --are--.

Column 12, line 18, change "FIGS. 22-21" to read --FIGS. 22-26--.

Column 13, line 66, change "7" to read --447--.

Column 13, line 67, change "4" to read --444--.

Column 14, line 62, after "the entrance into" delete --n--.

Column 15, line 34, change "70" to read --470--.

Column 15, line 36, change "06a" to read --406a--.

UNITED STATES PATENT AND TRADEMARK OFFICE
CERTIFICATE OF CORRECTION

PATENT NO. : 5,210,387
DATED : May 11, 1993
INVENTOR(S) : Donald P. Smith, et al It is certified that error appears in the above-indentified patent and that said Letters Patent is hereby corrected as shown below:

Column 15, line 40, change "84" to read --484--.

Column 15, line 51, after "Once the package" insert --10--.

Column 16, line 34, change "t he" to read --the--.

Column 16, line 59, change "movign" to read --moving--.

Column 16, line 65, after "stacks of packages" insert --,--.

Column 17, line 6, change "claim 10" to read --claim 1--.

Column 17, line 10, change "claim 11" to read --claim 2--.

Column 17, line 40, change "fo" to read --for--.

Column 18, line 36, after "gripper paddles" insert --may--.

UNITED STATES PATENT AND TRADEMARK OFFICE
CERTIFICATE OF CORRECTION

PATENT NO. : 5,210,387
DATED : May 11, 1993
INVENTOR(S) : Donald P. Smith, et al It is certified that error appears in the above-indentified patent and that said Letters Patent is hereby corrected as shown below:

Column 19, line 2, change "compartmetn" to read --compartment--.

Column 19, line 23, change "ot" to read --to--.

Column 19, line 26, change "movign" to read --moving--.

Column 19, line 26, change "form" to read --from--.

Signed and Sealed this

Twentieth Day of December, 1994

Attest:

BRUCE LEHMAN

*Attesting Officer*　　　*Commissioner of Patents and Trademarks*